(12) United States Patent
Inaba et al.

(10) Patent No.: US 6,934,012 B2
(45) Date of Patent: Aug. 23, 2005

(54) RANGING APPARATUS, RANGING METHOD, AND OPTO-ELECTRIC CONVERSION CIRCUIT

(75) Inventors: Naoto Inaba, Hiratsuka (JP); Masaya Nagasawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/680,174

(22) Filed: Oct. 8, 2003

(65) Prior Publication Data

US 2004/0070748 A1 Apr. 15, 2004

Related U.S. Application Data

(63) Continuation of application No. PCT/JP02/04122, filed on Apr. 25, 2002.

(30) Foreign Application Priority Data

| Apr. 25, 2001 | (JP) | ..................................... | 2001-127551 |
| May 1, 2001 | (JP) | ..................................... | 2001-133759 |
| May 1, 2001 | (JP) | ..................................... | 2001-133760 |
| May 1, 2001 | (JP) | ..................................... | 2001-133761 |
| May 1, 2001 | (JP) | ..................................... | 2001-133762 |

(51) Int. Cl.$^7$ ............................................. G01C 3/08
(52) U.S. Cl. ..................................... 356/5.03; 356/5.05
(58) Field of Search ............................... 356/5.01–5.15

(56) References Cited

U.S. PATENT DOCUMENTS

| 3,364,482 A | 1/1968 | Sones |
| 3,386,091 A | 5/1968 | Muchlinski et al. |

(Continued)

FOREIGN PATENT DOCUMENTS

| GB | 2 308 763 | 7/1997 |
| WO | WO 96/39611 | 12/1996 |
| WO | WO 99/12052 | 3/1999 |

OTHER PUBLICATIONS

"Digital Image Processing Techniques Applied to the Radar Detection Problem", C.R. Guarino, Proceedings of Southeastcon. Williamsburg, Proceedings of the Southeast Conference, New York, IEEEE, US, vol. 1, pp 702–706, Apr. 4–10, 1991.

"A Novel High–Gain Image Sensor Cell Based on Si p–n APD in Charge Storage Mode Operation", Komobuchi, et al., IEEE Transactions on Electron Devices, USA, vol. 37, No. 8, pp 1861–1868, Aug. 1990.

*Primary Examiner*—Thomas H. Tarcza
*Assistant Examiner*—Brian Andrea
(74) *Attorney, Agent, or Firm*—Morgan, Lewis & Bockius LLP

(57) ABSTRACT

A ranging apparatus 1 comprises a laser light emitter 3 for emitting pulsed laser light, a reflected light receiver 4 for receiving reflected light, a distance computer 10 for finding the distance from the elapsed time until the reflected light is received, and a distance display 8 for displaying this distance. The distance computer 10 has a counter 11 for counting the frequency when the reflected light satisfies a specific condition, a table production component 12 for producing a frequency distribution table corresponding to distance by adding up the counts, a distance determiner 13 for determining as the distance to the object of measurement the point when the frequencies in the frequency distribution table exceed a threshold, and a distance selector 15 for selecting a specific distance when a plurality of distances are determined, and displaying this distance on the distance display 8. As a result, when a plurality of distances are calculated, these distances can be appropriately displayed, improving the flexibility and functionality.

47 Claims, 13 Drawing Sheets

U.S. PATENT DOCUMENTS

| | | | |
|---|---|---|---|
| 3,500,396 A | | 3/1970 | Schmidt et al. |
| 3,728,725 A | | 4/1973 | Bauer |
| 3,743,419 A | * | 7/1973 | Skagerlund ............... 356/5.03 |
| 4,292,514 A | | 9/1981 | Ohtomo |
| 4,477,184 A | * | 10/1984 | Endo ..................... 356/141.1 |
| 4,899,159 A | | 2/1990 | Marchant |
| 5,319,972 A | | 6/1994 | Oblak et al. |
| 5,521,696 A | * | 5/1996 | Dunne ..................... 356/5.07 |
| 5,633,706 A | * | 5/1997 | Cho et al. ................. 356/5.01 |
| 5,724,141 A | * | 3/1998 | Nishino ..................... 356/623 |
| 5,933,224 A | * | 8/1999 | Hines et al. .............. 356/4.01 |
| 5,953,110 A | * | 9/1999 | Burns ....................... 356/5.01 |
| 5,966,678 A | | 10/1999 | Lam |
| 6,023,322 A | * | 2/2000 | Bamberger ............... 356/5.01 |
| 6,212,480 B1 | * | 4/2001 | Dunne ....................... 702/159 |
| 6,222,660 B1 | | 4/2001 | Traa |

* cited by examiner

| $Z_1$ | $Z_2$ | $Z_3$ | $Z_4$ | $Z_5$ | $Z_6$ | $Z_7$ | ... |
|---|---|---|---|---|---|---|---|
| 10 | 5 | 12 | 80 | 280 | 200 | 30 | ... |

(A)

(B)

RANGING APPARATUS, RANGING METHOD, AND OPTO-ELECTRIC CONVERSION CIRCUIT

The present application is a continuation of PCT International Application No. PCT/JP02/04122 filed Apr. 25, 2002, which is hereby incorporated by reference.

TECHNICAL FIELD

This invention relates to a ranging apparatus and ranging method with which laser light or the like is used to measure the distance to an object of measurement by a non-contact method, and to an opto-electric conversion circuit that can be used to advantage in such a ranging apparatus.

BACKGROUND ART

In conventionally known ranging apparatus and methods of this kind, pulsed measurement light (such as laser light) is emitted toward the object of measurement, the time it takes for the light to be reflected back from the object of measurement and received is measured, and the distance to the object of measurement is calculated from this elapsed time and the propagation speed of the laser light. However, when an object of measurement is thus irradiated with pulsed laser light and the light reflected back from the object of measurement is then received, what is received is not only the reflected laser light, but also natural light and so forth, which becomes noise light. This noise light is difficult to distinguish from the light reflected back from the object of measurement, so the problem is that it is difficult to measure distances accurately.

When ranging is performed in this way, as long as there is no change in the position of the object of measurement, the reflected light from the object of measurement is always received in a fixed length of time after the emission of the measurement light, but the timing at which noise light is received is random. In view of this, a method has been proposed whereby a frequency count is performed corresponding to distance (or to elapsed time) when the pulsed measurement light is emitted toward the object of measurement and the reflected light satisfies a specific condition for each emission, the frequencies counted for all of the measurement light emissions carried out repeatedly are added up to produce a frequency distribution table (histogram) corresponding to distance, and the distance at which the total count in this frequency distribution table is at its maximum is considered to be the distance to the object of measurement.

In the frequency distribution table produced as above, the timing at which the reflected light from the object of measurement is received is always constant, and the count is relatively high at the distance (or elapsed time) indicating this position. However, since the timing at which noise light is received is random, a frequency count corresponding to variously changing distances (or elapsed times) is performed for every frequency count carried out repeatedly, and the summed count is relatively low at the various distances (or elapsed times) in the frequency distribution table. Accordingly, if the distance corresponding to the point when a frequency increases in the frequency distribution table produced as described above (such as when it exceeds a specific threshold) is used as the distance to the object of measurement, the distance can be measured accurately by eliminating the effect of randomly occurring noise light.

Unfortunately, however, the following problems are encountered with this ranging method.

The first problem is as follows: Specifically, when the object of measurement is large and all of the laser light emitted from the ranging apparatus irradiates the object of measurement, it seems sufficient to calculate the distance corresponding to the point showing a high count in the frequency distribution table, but when the object of measurement is relatively small and the laser light also irradiates the area surrounding the object of measurement, so that reflected light from surrounding objects also comes back, or when there are a plurality of objects of measurement at varying distances within the laser light irradiation field of the ranging apparatus, so that reflected light comes back from each of the objects of measurement, there are a plurality of points showing high counts in the frequency distribution table. In cases such as these, a plurality of distances are calculated, but the issues of how to handle the plurality of distances and how to display them greatly affect the flexibility, functionality, and so forth of the ranging apparatus.

The second problem is as follows: Specifically, when the distance to the object of measurement is measured by irradiating the object of measurement with laser light through window glass, the laser light reflected by the window glass is also always received corresponding to the distance to this window glass. In general, the intensity of the light reflected from the window glass is low, but since the intensity of the reflected light received by a light receiver is greater for near objects than for objects farther away, the reflected light intensity detected by the light receiver is such that the reflected light from the object of measurement, which is farther away, is not readily discernable from the reflected light from the nearer window glass, so both of these may end up being counted, or just the reflected light from the window glass may be counted. In a case such as this, there is the danger that the count corresponding to the distance of the window glass will increase in the frequency distribution table, so that the distance corresponding to the position of the window glass will be mistakenly determined as the distance to the object of measurement. Similarly, if tree branches or the like are in front of the object, the reflected light from the tree branches is received, and these branches may end up being mistakenly judged to be the object of measurement.

The third problem is as follows: Namely, when a distance is measured by looking at the object of measurement through window glass, or when a distance is measured by looking at the object of measurement through tree branches, the reflected light from the window glass, tree branches, or the like, located in front of the object of measurement is also constantly received. Consequently, there is the danger that the frequency corresponding to the distance of these obstacles will be high in the frequency distribution table, so that the distance thereof will be determined as the distance to the object of measurement, the result being that the measured distance to the object of measurement is inaccurate.

Furthermore, the position at which the frequency in the frequency distribution table increases can be affected by the shaking of the user's hands when the ranging apparatus is held in the hands during measurement, atmospheric fluctuations in the measurement environment, and other such effects, which is a problem in that the measured distance is inconsistent, or frequencies with an extremely large peak appearing to be noise may occur in the frequency distribution table, and the direct use of these frequencies results in incorrect distance measurement. Also, when the distance to an object of measurement that spreads out longitudinally is measured, such as when the distance to a building is measured by looking obliquely at the walls of the building, it is difficult to determine the distance if the frequency increases over a wide range of distances.

The fourth problem is as follows: Specifically, the reflected light intensity from the object of measurement varies with the distance to the object of measurement, varies with the type of object of measurement (this is due to differences in the reflectivity of the object of measurement itself, for example), and also varies with the measurement conditions (such as whether the measurement is conducted in a bright or dark location, and whether the measurement is conducted under weather conditions that are clear, cloudy, rainy, foggy, etc.), so the counts in the frequency distribution table can fluctuate greatly depending on these factors. Consequently, it is extremely difficult to determine the level of frequency for the distance in the frequency distribution table to be taken as the position of the object of measurement.

In particular, to perform this determination by internal arithmetic processing in a ranging apparatus, the general practice is to preset a determination threshold, and automatically determine as the distance to the object of measurement the distance having a frequency that exceeds this determination threshold in the frequency distribution table. In this case, if the preset determination threshold is too high, there is a concern that no frequency over this threshold will be found, and the distance to the object of measurement cannot be specified, but on the other hand, if the determination threshold is too low, many frequencies over this threshold may be found, making it impossible to specify which of these is the distance to the object of measurement.

Furthermore, in a laser ranging apparatus such as this, the intensity of the reflected light weakens as the distance to the object of measurement increases, so high sensitivity is required to detect faint light, and an extremely short time must also be detected accurately. Avalanche photodiodes have been used as opto-electric conversion elements that meet these requirements.

Thus, avalanche photodiodes are often used when faint light needs to be detected at high sensitivity (high amplification) and at a high response rate.

However, because of their high sensitivity, avalanche photodiodes also have the drawback of low stability. Specifically, the proportion of current flowing with respect to light of a given intensity (referred to as the current multiplication factor) is a function of the reverse bias voltage being applied. Also, the current multiplication factor tends to increase sharply as the applied reverse bias voltage approaches the breakdown voltage. Thus, in order to raise the light detection sensitivity, it is preferable to use a voltage close to the breakdown voltage as the reverse bias voltage to be applied.

However, temperature affects the breakdown voltage, so if the reverse bias voltage is close to the breakdown voltage, a change in the breakdown voltage will greatly alter the current multiplication factor.

This situation is illustrated in FIG. 14, which is a graph of the relationship between the reverse bias voltage and the current multiplication factor (a value indicating the amount of current flowing when a given amount of light comes in). When this relationship is as indicated by the solid line, if the reverse bias voltage is set at $V_0$, then the current multiplication factor is $\alpha_0$. However, when a change in the breakdown voltage causes this relationship to shift as indicated by the broken line, the current multiplication factor changes to $\alpha_0'$.

When this happens, if the avalanche photodiodes are used with a laser ranging apparatus to detect reflected light from an object of measurement, the output from the detector changes independently of the amount of reflected light, producing an error in the measurement timing for received reflected light, and in extreme cases measurement may not even be possible.

Accordingly, a device that would keep the temperature constant within the detector was added to conventional units, or the avalanche photodiodes were used at a lower current multiplication factor, so that the avalanche photodiodes would operate stably. In the former case, the cost of the apparatus increased by the cost of the device used to keep the temperature constant, and in the latter case, because there was a limit to the amount of light that could be detected, the measurable distance became shorter when the avalanche photodiodes were used with a laser ranging apparatus.

DISCLOSURE OF THE INVENTION

The present invention was conceived in an effort to solve these problems.

Specifically, the first object of the present invention is to provide a ranging apparatus and method with excellent flexibility or functionality for calculating a plurality of distances as discussed above and displaying these in an appropriate manner.

The second object of the present invention is to allow the distance to an object of measurement to be measured accurately, without being affected by reflected light from an obstacle even when window glass, tree branches, or other such obstacles are present in front of the object of measurement.

The third object of the present invention is to allow accurate ranging to be performed even when there are frequencies with large peaks in the frequency distribution table, or when the frequencies increase over a broad range, for example.

The fourth object of the present invention is to allow the frequency corresponding to an object of measurement to be accurately extracted using a threshold, and to accurately measure the distance to the object of measurement, when the distance to the object of measurement is determined to be the distance at the point when a frequency in the frequency distribution table exceeds a specific threshold as discussed above.

The fifth object of the present invention is to provide an opto-electric conversion circuit that makes use of avalanche photodiodes which operate stably at high current multiplication factors, and a laser ranging apparatus that makes use of this circuit.

To achieve the first object stated above, the first ranging apparatus pertaining to the present invention comprises a measurement light emitter for emitting pulsed measurement light toward an object of measurement, a reflected light receiver for receiving light reflected back from the object of measurement, a distance computer for finding the distance to the object of measurement on the basis of the elapsed time from when the measurement light is emitted until the reflected light is received, and a distance display for displaying the distance to the object of measurement. Furthermore, the distance computer comprises a counter for counting the frequency corresponding to distance when the reflected light satisfies a specific condition, a table production component for producing a frequency distribution table corresponding to distance by adding up the frequencies with respect to the measurement light repeatedly emitted a specific number of times, a distance determiner for determining as the distance to the object of measurement the point when the total count in the frequency distribution table exceeds a specific threshold, and a distance selector for selecting (a) specific distance(s) from among a plurality of distances when the distance determiner determines a plurality of distances to the object of measurement, and displaying the selected distance on the distance display.

To achieve the first object stated above, the second ranging apparatus pertaining to the present invention, just as with the above-mentioned first ranging apparatus, comprises a measurement light emitter for emitting pulsed measurement light toward an object of measurement, a reflected light receiver for receiving light reflected back from the object of measurement, a distance computer for finding the distance to the object of measurement on the basis of the elapsed time from when the measurement light is emitted until the reflected light is received, and a distance display for displaying the distance to the object of measurement. With this ranging apparatus, however, the distance computer comprises a counter for counting the frequency corresponding to elapsed time when the reflected light satisfies a specific condition, a table production component for producing a frequency distribution table corresponding to elapsed time by adding up the frequencies with respect to the measurement light repeatedly emitted a specific number of times, a distance determiner for determining as the distance to the object of measurement the elapsed time, converted to distance, at which the total count in the frequency distribution table produced by the table production component exceeds a specific threshold, and a distance selector for selecting (a) specific distance(s) from among a plurality of distances when the distance determiner determines a plurality of distances to the object of measurement, and displaying the selected distance on the distance display.

As discussed above, when there are a plurality of objects to be irradiated with measurement light, reflected light comes back from each of these objects, so a plurality of distances are calculated. In this case, with the first and second ranging apparatus, a specific distance is selected by the distance selector, and a ranging apparatus with excellent flexibility and functionality can be obtained by suitably selecting and displaying a plurality of distances.

To select and display the proper distance as above, the distance selector can select the longest distance and display it on the distance display. Conversely, the distance selector may instead select the shortest distance and display it on the distance display. Furthermore, the distance selector may select the n-th (where n is a positive integer) longest distance from among a plurality of distances and display it on the distance display.

The distance selector may be constructed so that the selection conditions are set by external operation by the user, in which case, when the distance determiner determines a plurality of distances to the object of measurement, a specific distance is selected on the basis of the selection conditions set in the distance selector, and displayed on the distance display.

When the distance determiner determines a plurality of distances to the object of measurement, the distance selector may select the distance according to a usage condition, etc., and display it on the distance display. The focal point of a finder for sighting the object of measurement can be used as the usage condition, for example, so that the distance selector selects a long distance when the focal point is far, and selects a short distance when the focal point is near. The weather at the time of ranging can also be used as the usage condition, so that the distance selector selects a long distance when measuring the distance to a target in the rain or snow. These usage conditions, etc., may be switched and set by the user.

When the distance determiner determines a plurality of distances to the object of measurement, it is also possible to design the distance selector so that the distance selector determines that there are a plurality of objects of measurement, and displays a plurality of distances on the distance display. In this case, all of the plurality of distances may be displayed at once on the distance display, or the plurality of distances may be displayed one after another on the distance display.

The intensity of the reflected light can also be used as the specific condition that is employed in the counter of the above-mentioned first and second ranging apparatus. In this case, the counter performs a frequency count when the intensity of the reflected light exceeds a specific intensity threshold.

To achieve the first object stated above, the first ranging method pertaining to the present invention is one in which pulsed measurement light is emitted toward an object of measurement, and the distance to the object of measurement is determined on the basis of the elapsed time until the light reflected back from the object of measurement is received; in this method, the pulsed measurement light is first repeatedly emitted toward the object of measurement, a frequency count corresponding to distance is performed when the reflected light for each emission satisfies a specific condition, a frequency distribution table corresponding to distance is produced by adding up the frequencies counted in all of the measurement light emissions carried out a specific number of times, the point when the total count in the frequency distribution table exceeds a threshold is determined as the distance to the object of measurement, and this distance is displayed. In this case, when a plurality of distances to the object of measurement are determined, a specific distance is selected and displayed from among these distances.

To achieve the first object stated above, the second ranging method pertaining to the present invention, just as with the above-mentioned first ranging method, is one in which pulsed measurement light is emitted toward an object of measurement, and the distance to the object of measurement is determined on the basis of the elapsed time until the light reflected back from the object of measurement is received; here, the pulsed measurement light is repeatedly emitted toward the object of measurement, a frequency count corresponding to elapsed time is performed when the reflected light for each emission satisfies a specific condition, a frequency distribution table corresponding to elapsed time is produced by adding up the frequencies counted in all of the measurement light emissions carried out a specific number of times, the distance is found from the elapsed time at which the total count in the frequency distribution table exceeds a threshold, and this distance is determined as the distance to the object of measurement and displayed. Again with this method, when a plurality of distances to the object of measurement are determined, a specific distance is selected and displayed from among these distances.

With the first and second ranging methods constituted as above, when there are a plurality of objects being irradiated with measurement light and a plurality of distances are calculated, a ranging method with excellent flexibility and functionality can be obtained, for example, by suitably selecting and displaying a plurality of distances.

Furthermore, the intensity of the reflected light can be used as the above-mentioned specific condition for performing a frequency count in the above-mentioned first and second ranging methods, and the frequency may be counted when the intensity of the reflected light exceeds a specific intensity threshold.

With the first and second ranging apparatus and the first and second ranging methods pertaining to the present invention as discussed above, pulsed measurement light is repeatedly emitted toward an object of measurement, a frequency distribution table corresponding to distance or elapsed time is produced by adding up the frequencies counted in all of the above-mentioned measurement light emissions, and the point when the total count in the frequency distribution table exceeds a threshold is determined as the distance to the object of measurement; here, when a plurality of distances to the object of measurement are determined, a specific distance is selected and displayed from among the plurality of distances. Accordingly, when there are a plurality of objects to be irradiated with measurement light, and reflected light comes back from each of these objects, so that a plurality of distances are calculated, or when the distances of objects surrounding the object of measurement are calculated, a ranging apparatus with excellent flexibility and functionality can be obtained by suitably selecting and displaying a specific distance with the distance selector.

To achieve the second object stated above, the third ranging apparatus pertaining to the present invention comprises a measurement light emitter for emitting pulsed measurement light toward an object of measurement, a reflected light receiver for receiving light reflected back from the object of measurement, and a distance computer for finding the distance to the object of measurement on the basis of the elapsed time from when the measurement light is emitted until the reflected light is received. Furthermore, the distance computer comprises a counter for counting the frequency corresponding to distance when the reflected light satisfies a specific condition, a table production component for producing a frequency distribution table corresponding to distance by adding up the frequencies with respect to the measurement light repeatedly emitted a specific number of times, and a distance determiner for determining as the distance to the object of measurement the point when the total count in the frequency distribution table produced by the table production component exceeds a specific threshold. Here, the threshold used in the determination made by the distance determiner is varied and set according to distance in the frequency distribution table. Furthermore, this threshold is preferably set so as to decrease as the distance increases.

To achieve the second object stated above, the fourth ranging apparatus pertaining to the present invention, just as with the above-mentioned third ranging apparatus, comprises a measurement light emitter for emitting pulsed measurement light toward an object of measurement, a reflected light receiver for receiving light reflected back from the object of measurement, and a distance computer for finding the distance to the object of measurement on the basis of the elapsed time from when the measurement light is emitted until the reflected light is received. With this ranging apparatus, however, the distance computer comprises a counter for counting the frequency corresponding to elapsed time when the reflected light satisfies a specific condition, a table production component for producing a frequency distribution table corresponding to elapsed time by adding up the frequencies with respect to the measurement light repeatedly emitted a specific number of times, and a distance determiner for determining as the distance to the object of measurement the elapsed time, converted to distance, at which the total count in the frequency distribution table produced by the table production component exceeds a specific threshold. The threshold used by this distance determiner is varied and set according to elapsed time in the above-mentioned frequency distribution table. In this case, furthermore, it is preferable if the threshold is set so as to decrease as the elapsed time increases in the frequency distribution table.

As discussed above, when an object of measurement is irradiated with laser light and the distance to the object of measurement is measured, the reflected light intensity from a nearby object is generally higher. With the above-mentioned third and fourth ranging apparatus, the distance determiner is constituted so as to find the distance to the object of measurement by using a threshold varied and set according to distance or elapsed time in the frequency distribution table (preferably set so as to decrease as the distance or elapsed time increases), so accurate distance measurement (ranging) can be performed whether the object of measurement is near or far.

Furthermore, when the distance to an object of measurement is measured by looking at the object of measurement through window glass or tree branches, the intensity of the reflected light from the window glass, etc., is lower than the reflected light intensity when the object of measurement is in the same position as these obstacles, but since the window glass, etc., is located closer than the object of measurement, the reflected light from the window glass, etc., is sometimes counted along with that of the object of measurement. Even in a case such as this, because the distance determiner of the present invention determines the object of measurement by using a threshold varied and set according to distance or elapsed time, any window glass, etc., located nearby will not be mistakenly identified as being the object of measurement, so that the distance to the object of measurement can be measured accurately.

Furthermore, the intensity of reflected light can be used as the specific condition used by the counter of the above-mentioned third and fourth ranging apparatus, in which case the counter performs a frequency count when the intensity of the reflected light exceeds a specific intensity threshold.

To achieve the second object stated above, the third ranging method pertaining to the present invention is one in which pulsed measurement light is emitted toward an object of measurement, and the distance to the object of measurement is determined on the basis of the elapsed time until the light reflected back from the object of measurement is received; in this method, the pulsed measurement light is first repeatedly emitted toward the object of measurement, a frequency count corresponding to distance is performed when the reflected light for each emission satisfies a specific condition, a frequency distribution table corresponding to distance is produced by adding up the frequencies counted in all of the measurement light emissions carried out a specific number of times, and the point when the total count in the frequency distribution table exceeds a threshold set so as to vary according to distance is determined as the distance to the object of measurement. In this case, it is preferable if this threshold is set so as to decrease as the distance increases.

To achieve the second object stated above, the fourth ranging method pertaining to the present invention, just as with the above-mentioned third ranging method, is one in which pulsed measurement light is emitted toward an object of measurement, and the distance to the object of measurement is determined on the basis of the elapsed time until the light reflected back from the object of measurement is received; here, the pulsed measurement light is repeatedly emitted toward the object of measurement, a frequency count corresponding to elapsed time is performed when the reflected light for each emission satisfies a specific condition, a frequency distribution table corresponding to elapsed time is produced by adding up the frequencies counted in all of the measurement light emissions carried out a specific number of times, the distance is found from the elapsed time at which the total count in the frequency distribution table exceeds a threshold set so as to vary according to elapsed time, and this distance is determined as the distance to the object of measurement. With this method, it is preferable if the threshold is set so as to decrease as the elapsed time increases.

With the third and fourth ranging methods constituted as above, the distance to the object of measurement is determined by using a threshold varied and set according to distance or elapsed time in the frequency distribution table (preferably set so as to decrease as the distance or elapsed time increases). Accordingly, accurate distance measurement (ranging) can be performed whether the object of measurement is near or far. Furthermore, when the distance to an object of measurement is measured by looking at the object of measurement through window glass or tree branches, even if the reflected light from the window glass, etc., is counted along with that of the object of measurement, since in these methods the object of measurement is determined by using a threshold varied and set according to distance or elapsed time, any window glass, etc., located nearby will not be mistakenly identified as being the object of measurement, allowing the distance to the object of measurement to be measured accurately.

In the above-mentioned third and fourth ranging methods, the intensity of the reflected light can be used as the above-mentioned specific condition for performing the frequency count, and the frequency may be counted when the reflected light intensity exceeds a specific intensity threshold.

As described above, with the above-mentioned third and fourth ranging apparatus and third and fourth ranging methods, pulsed measurement light is repeatedly emitted toward an object of measurement, a frequency distribution table corresponding to distance or elapsed time is produced by adding up the frequencies counted in all of the above-mentioned measurement light emissions, and the point when the total count in the frequency distribution table exceeds a threshold set so as to vary according to distance or elapsed time (preferably set so as to decrease as the distance or elapsed time increases) is determined as the distance to the object of measurement. Accordingly, accurate distance measurement (ranging) can be performed whether the object of measurement is near or far.

In particular, when the distance to an object of measurement is measured by looking at the object of measurement through window glass or tree branches, the reflected light from the window glass, etc., is sometimes counted along with that of the object of measurement. Even in this case, however, because the distance determiner of these ranging apparatus determines the object of measurement by using a threshold varied and set according to distance or elapsed time, any window glass, etc., located nearby will not be mistakenly identified as being the object of measurement, allowing the distance to the object of measurement to be measured accurately.

To achieve the third object stated above, the fifth ranging apparatus pertaining to the present invention comprises a measurement light emitter for emitting pulsed measurement light toward an object of measurement, a reflected light receiver for receiving light reflected back from the object of measurement, and a distance computer for finding the distance to the object of measurement on the basis of the elapsed time from when the measurement light is emitted until the reflected light is received. Furthermore, the distance computer comprises a counter for counting the frequency corresponding to distance when the reflected light satisfies a specific condition, a table production component for producing a frequency distribution table corresponding to distance by adding up the frequencies with respect to the measurement light repeatedly emitted a specific number of times, and performing moving averaging in which the frequency at each distance added up in this manner is replaced with an average frequency at a plurality of distances including the distance itself and those before and after that distance, and a distance determiner for determining as the distance to the object of measurement the point when the total count in the frequency distribution table produced by the table production component exceeds a specific threshold.

To achieve the third object stated above, the sixth ranging apparatus pertaining to the present invention, just as with the above-mentioned fifth ranging apparatus, comprises a measurement light emitter for emitting pulsed measurement light toward an object of measurement, a reflected light receiver for receiving light reflected back from the object of measurement, and a distance computer for finding the distance to the object of measurement on the basis of the elapsed time from when the measurement light is emitted until the reflected light is received. With this ranging apparatus, however, the distance computer comprises a counter for counting the frequency corresponding to elapsed time when the reflected light satisfies a specific condition, a table production component for producing a frequency distribution table corresponding to elapsed time by adding up the frequencies with respect to the measurement light repeatedly emitted a specific number of times, and performing moving averaging in which the frequency at each elapsed time added up in this manner is replaced with an average frequency at a plurality of elapsed times including the elapsed time itself and those before and after that elapsed time, and a distance determiner for determining as the distance to the object of measurement the elapsed time, converted as distance, at which the total count in the frequency distribution table exceeds a specific threshold.

In the above-mentioned fifth and sixth ranging apparatus, it is desirable if the number of distances or elapsed times for which an average is calculated by moving averaging can be variably set.

Thus, with the fifth and sixth ranging apparatus, the frequency distribution table is produced using a count that has undergone moving averaging, rather than using the count directly as it comes from the counter. Accordingly, in cases where the distance is measured by looking at the object of measurement through window glass or tree branches, even when there is a frequency with a large peak in the frequency distribution table due to reflected light from the window glass, etc., or even when there is a frequency with a large peak due to noise light, the peak can be lowered by performing moving averaging in which an average frequency is taken of a plurality of frequencies including of this peak and of those before and after this peak, allowing the distance to the object of measurement to be measured accurately.

Moreover, even if there is variance in the position at which the frequency increases in the frequency distribution table due to the shaking of the user's hands when the ranging apparatus is held in the hands during measurement, atmospheric fluctuations in the measurement environment, and other such effects, the distance can still be measured accurately by using moving averaging to reduce the effect of this variance. Furthermore, when measuring the distance to an object of measurement having longitudinal spread (that is, with depth), as is the case when measuring the distance to a building whose walls are viewed obliquely, the count increases over a wide range of distances, but if this frequency is subjected to moving averaging, the middle position in this broad distance range can be ascertained, so that accurate distance measurement will still be possible.

Specifically, by performing moving averaging, the frequencies with large peaks that occur in the frequency distribution table are smoothed out, the middle part of a frequency that increases over a broad range can be emphasized, the effect of high noise frequencies can be eliminated, the middle part of a broad range can be ascertained, and accurate distance measurement will be possible even in the above-described situations.

The intensity of the reflected light can be used as the specific condition in the counter of the above-mentioned fifth and sixth ranging apparatus, in which case the counter performs a frequency count when the intensity of the reflected light exceeds a specific intensity threshold.

To achieve the third object stated above, the fifth ranging apparatus pertaining to the present invention comprises a measurement light emitter for emitting pulsed measurement light toward an object of measurement, a reflected light receiver for receiving light reflected back from the object of measurement, and a distance computer for finding the distance to the object of measurement on the basis of the elapsed time from when the measurement light is emitted until the reflected light is received. Furthermore, the distance computer comprises a counter for counting the frequency corresponding to distance when the reflected light satisfies a specific condition, a table production component for producing a frequency distribution table corresponding to distance by adding up the frequencies with respect to the measurement light repeatedly emitted a specific number of times, and performing moving averaging in which the frequency at each distance added up in this manner is replaced with an average frequency at a plurality of distances including the distance itself and those before and after that distance, and a distance determiner for determining as the distance to the object of measurement the point when the total count in the frequency distribution table produced by the table production component exceeds a specific threshold.

To achieve the third object stated above, the sixth ranging method pertaining to the present invention, just as with the above-mentioned first ranging method, is one in which pulsed measurement light is emitted toward an object of measurement, and the distance to the object of measurement is determined on the basis of the elapsed time until the light reflected back from the object of measurement is received; here, the pulsed measurement light is repeatedly emitted toward the object of measurement, a frequency count corresponding to elapsed time is performed when the reflected light for each emission satisfies a specific condition, a frequency distribution table corresponding to elapsed time is produced by adding up the frequencies counted in all of the measurement light emissions carried out a specific number of times, and by replacing the frequency at each elapsed time added up in this manner with an average frequency at a plurality of elapsed times including the elapsed time itself and those before and after that elapsed time, the distance is found from the elapsed time at which the total count in the frequency distribution table exceeds a threshold, and this distance is determined as the distance to the object of measurement.

Again with the fifth and sixth ranging methods structured as above, since the frequency distribution table is produced by performing moving averaging of the count, the frequencies with large peaks in the frequency distribution table are smoothed out, and the middle part of a frequency that increases over a broad range can be emphasized; consequently, the effect of high noise frequencies can be eliminated, the middle part of a broad range can be ascertained, and accurate distance measurement is possible.

Furthermore, in the above-mentioned fifth and sixth ranging methods, the intensity of the reflected light can be used as the above-mentioned specific condition for performing a frequency count, and the frequency may be counted when the intensity of the reflected light exceeds a specific intensity threshold.

With the fifth and sixth ranging apparatus and the fifth and sixth ranging methods pertaining to the present invention as discussed above, pulsed measurement light is repeatedly emitted toward an object of measurement, a frequency distribution table is produced by adding up the frequencies counted in all of the above-mentioned measurement light emissions and subjecting the frequency thus added up to moving averaging corresponding to distance or elapsed time, and the point when the total count in this frequency distribution table exceeds a threshold is determined as the distance to the object of measurement. By thus performing moving averaging, the frequencies with large peaks occurring in the frequency distribution table are smoothed out, and the middle part of a frequency that increases over a broad range can be emphasized. Consequently, the effect of high noise frequencies can be eliminated, the middle part of a broad range can be ascertained, and accurate distance measurement is possible.

To achieve the fourth object stated above, the seventh ranging apparatus pertaining to the present invention comprises a measurement light emitter for emitting pulsed measurement light toward an object of measurement, a reflected light receiver for receiving light reflected back from the object of measurement, and a distance computer for finding the distance to the object of measurement on the basis of the elapsed time from when the measurement light is emitted until the reflected light is received. Furthermore, the distance computer comprises a counter for counting the frequency corresponding to distance when the reflected light satisfies a specific condition, a table production component for producing a frequency distribution table corresponding to distance by adding up the frequencies with respect to the measurement light repeatedly emitted a specific number of times, and a distance determiner for determining as the distance to the object of measurement the point when the total count in the frequency distribution table produced by the table production component exceeds a specific threshold. A plurality of types of the threshold used in the determination by the distance determiner are set in this case.

To achieve the fourth object stated above, the eighth ranging apparatus pertaining to the present invention, just as with the above-mentioned seventh ranging apparatus, comprises a measurement light emitter for emitting pulsed measurement light toward an object of measurement, a reflected light receiver for receiving light reflected back from the object of measurement, and a distance computer for finding the distance to the object of measurement on the basis of the elapsed time from when the measurement light is emitted until the reflected light is received. With this ranging apparatus, though, the distance computer comprises a counter for counting the frequency corresponding to elapsed time when the reflected light satisfies a specific condition, a table production component for producing a frequency distribution table corresponding to elapsed time by adding up the frequencies with respect to the measurement light repeatedly emitted a specific number of times, and a distance determiner for determining as the distance to the object of measurement the elapsed time, converted to distance, at which the total count in the frequency distribution table produced by the table production component exceeds a specific threshold. A plurality of types of the threshold used in this distance determiner are set.

When the frequency distribution table is produced by adding up the frequencies counted by the counter, the reflected light intensity varies with the distance to the object of measurement, with the type of object of measurement (the reflectivity of the measurement light), and with the measurement conditions (such as brightness and weather); accordingly, ranging of the same object of measurement can yield markedly different counts in the frequency distribution table depending on the above variations. Consequently, with the seventh and eighth ranging apparatus described above, a plurality of types of threshold are set, and the threshold is switched according to the above-mentioned conditions, which allows the distance having the frequency corresponding to the object of measurement to be accurately determined.

Because of this, it is preferable with the above-mentioned seventh and eighth ranging apparatus if the distance computer is provided with a threshold selector used to select from among the plurality of types of threshold according to the determination of the distance determiner. In this case, it is preferable if when none of the total count in the frequency distribution table exceeds the threshold selected by the threshold selector, the threshold selector switches to a threshold with a lower value than the selected threshold, and when there are a plurality of (or many) counts out of the total counts in the frequency distribution table that exceed the threshold selected by the threshold selector, the threshold selector switches to a threshold with a higher value than the selected threshold.

To achieve the fourth object stated above, the seventh ranging method pertaining to the present invention is one in which pulsed measurement light is emitted toward an object of measurement, and the distance to the object of measurement is determined on the basis of the elapsed time until the light reflected back from the object of measurement is received; in this method, the pulsed measurement light is first repeatedly emitted toward the object of measurement, a frequency count corresponding to distance is performed when the reflected light for each emission satisfies a specific condition, a frequency distribution table corresponding to distance is produced by adding up the frequencies counted in all of the measurement light emissions carried out a specific number of times, and the point when the total count in the frequency distribution table exceeds a threshold is determining as the distance to the object of measurement. In this case, a plurality of types of threshold are set, and the plurality of types of threshold are selected and used.

Furthermore, the intensity of the reflected light can be used as the specific condition used by the counter in the above-mentioned seventh and eighth ranging apparatus, in which case the counter performs a frequency count when the intensity of the reflected light exceeds a specific intensity threshold.

To achieve the fourth object stated above, the eighth ranging method pertaining to the present invention, just as with the above-mentioned ranging method, is one in which pulsed measurement light is emitted toward an object of measurement, and the distance to the object of measurement is determined on the basis of the elapsed time until the light reflected back from the object of measurement is received; here, the pulsed measurement light is repeatedly emitted toward the object of measurement, a frequency count corresponding to elapsed time is performed when the reflected light for each emission satisfies a specific condition, a frequency distribution table corresponding to elapsed time is produced by adding up the frequencies counted in all of the measurement light emissions carried out a specific number of times, the distance is found from the elapsed time at which the total count in the frequency distribution table exceeds a threshold, and this distance is determined as the distance to the object of measurement. Again with this method, a plurality of types of threshold are set, and the plurality of types of threshold are selected and used.

When the frequency distribution table is produced by adding up the frequencies counted by the counter, since the intensity of the reflected light varies with the distance to the object of measurement, with the type of object of measurement (the reflectivity of the measurement light), and with the measurement conditions (such as brightness and weather), the counts in the frequency distribution table vary greatly with the above variations. However, the distance having the frequency corresponding to the object of measurement can be accurately determined with the seventh and eighth ranging methods by switching among the plurality of types of threshold according to the distance determination conditions.

Because of this, it is preferable that in the above-mentioned seventh and eighth ranging methods, when none of the total counts in the frequency distribution table exceed the selected specific threshold, this threshold be switched to a threshold with a lower value, and that when a plurality of (or many) total counts in the frequency distribution table exceed the selected threshold, this threshold be switched to a threshold with a higher value.

Furthermore, the intensity of the reflected light can be used as the above-mentioned specific condition for counting the frequency in the above-mentioned seventh and eighth ranging methods, and the frequency may be counted when the intensity of the reflected light exceeds a specific intensity threshold.

With the seventh and eighth ranging apparatus and the seventh and eighth ranging methods pertaining to the present invention as discussed above, pulsed measurement light is repeatedly emitted toward an object of measurement, a frequency distribution table corresponding to distance or elapsed time is produced by adding up the frequencies counted in all of the above-mentioned measurement light emissions, and a plurality of types of threshold are set for determining as the distance to the object of measurement the point when the total count in the frequency distribution table exceeds a threshold. Accordingly, even if the frequencies in the frequency distribution table vary greatly with the distance to the object of measurement, with the type of object of measurement (the reflectivity of the measurement light), and with the measurement conditions (such as brightness and weather), the distance having the frequency corresponding to the object of measurement can be accurately determined by switching the threshold according to the conditions during the determination of the distance to the object of measurement.

To achieve the fifth object stated above, the opto-electric conversion circuit pertaining to the present invention is an opto-electric conversion circuit in which an avalanche photodiode is used, comprising a reverse bias voltage regulating component for regulating the reverse bias voltage applied to the avalanche photodiode, a measurement component for measuring the current flowing to the avalanche photodiode, a reference reverse bias voltage detecting component for regulating the above-mentioned reverse bias voltage and detecting the reverse bias voltage at which a specific current flows to the avalanche photodiode (reference reverse bias voltage), and a reverse bias voltage setting component for adjusting the reverse bias voltage applied to the above-mentioned avalanche photodiode during opto-electric conversion to a voltage obtained by multiplying the above-mentioned detected reference reverse bias voltage by a specific ratio.

With such an opto-electric conversion circuit, in a non-measurement state, the reverse bias voltage applied to the avalanche photodiode is varied by the reverse bias voltage regulating component, and the reverse bias voltage at which a predetermined specific current flows to the avalanche photodiode is detected by the reference reverse bias voltage detecting component. This is equivalent to measuring the breakdown voltage. During measurement, furthermore, the reverse bias voltage regulating component is driven by the reverse bias voltage setting component, and the reverse bias voltage applied to the avalanche photodiode is adjusted to a voltage obtained by multiplying the above-mentioned detected voltage by a specific ratio. As a result, even if the breakdown voltage varies with temperature or other factors, the current multiplication factor can be kept constant, affording stable light detection. Thus, the circuit can be used at a reverse bias voltage having a high current multiplication factor, and faint light can be stably detected.

The above-mentioned specific ratio can be set greater than 1, but setting this ratio to less than or equal to 1, detecting the voltage at which a large current flows, and using the circuit at a voltage lower than this is usually a more stable usage method. Furthermore, if the specific ratio is set at 1, a voltage regulating component is not driven, and the reference reverse bias voltage is used directly as the reverse bias voltage during opto-electric conversion.

To achieve the fifth object stated above, the ninth ranging apparatus pertaining to the present invention is a laser ranging apparatus which measures the distance to an object of measurement by radiating laser light toward the object of measurement and measuring the time differential between the point when the laser light is radiated and the point when the laser light reflected back from the object of measurement is received, wherein the circuit for detecting the receipt of laser light reflected back from the object of measurement has the above-mentioned opto-electric conversion circuit.

With this ranging apparatus, because the above-mentioned opto-electric conversion circuit is used for the circuit that detects the laser light reflected back from the object of measurement, reflected light can be detected at a high current multiplication factor that is always stable. Therefore, any measurement error or states in which detection is impossible due to instability of a photodetection circuit can be prevented, and since stable detection of even faint light is possible, the measurable distance can be increased.

With this ranging apparatus, the reverse bias voltage setting component can be actuated at various points in time, such as every time the power is turned on to the laser ranging apparatus, every time measurement is commenced, at specific time intervals, or every time the temperature changes by at least a specific amount, but it is preferable to actuate this component every time measurement is commenced or every time the power to the apparatus is turned on, because this will yield the most accurate results.

BEST MODE FOR CARRYING OUT THE INVENTION

Embodiments considered to be the best mode for carrying out the present invention are described below through reference to drawings, but these descriptions should not be construed to limit the scope of the present invention.

Figure 1:
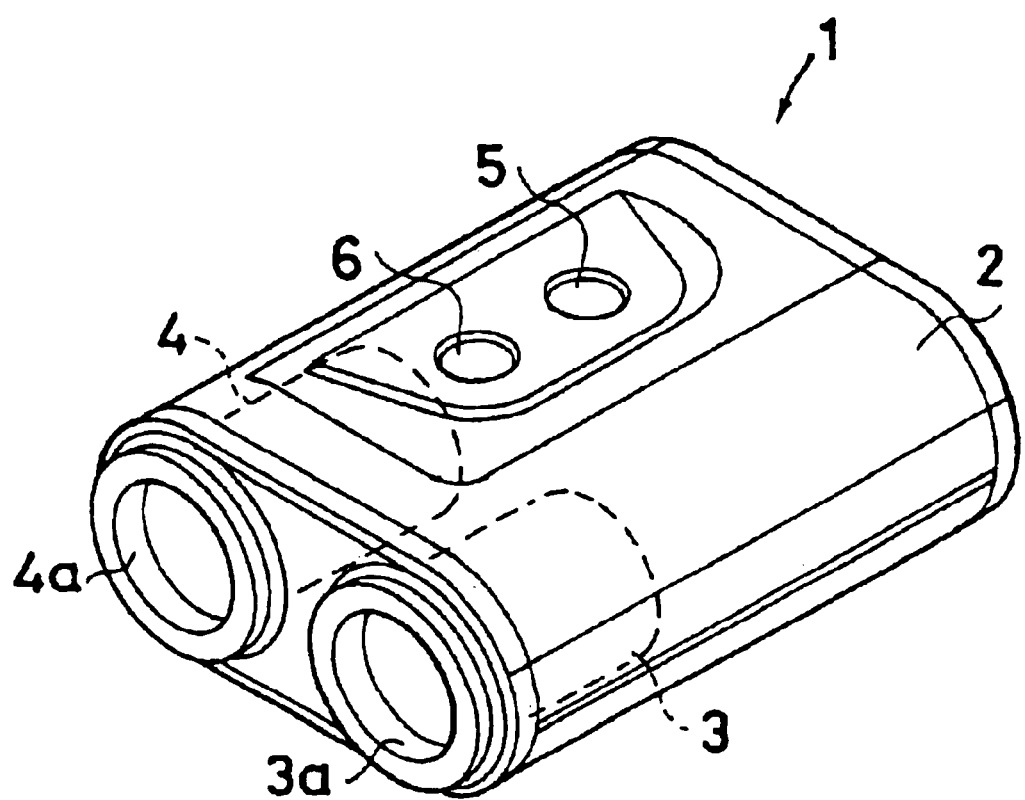
FIG. 1 is an oblique view showing the external appearance of the ranging apparatus in one embodiment of the present invention.

FIG. 1 shows a ranging apparatus 1 that is a first embodiment of the present invention. This ranging apparatus 1 consists of a laser light emitter 3 and a reflected light receiver 4 housed in a case 2. A laser light emission window 3a through which pulsed laser light (measurement light) from the laser light emitter 3 is emitted, and a reflected light reception window 4a through which reflected light is received, are provided to the case 2. A first control button 5 for switching the power on and off and commencing ranging, and a second control button 6 for display selection, are provided on the upper surface of the case 2. A finder window 2a (see FIG. 3) is provided on the back surface of the case 2, and the user (who uses this ranging apparatus 1 to perform ranging) measures the distance to an object of measurement by looking at the object of measurement through the finder window 2a.

Figure 2:
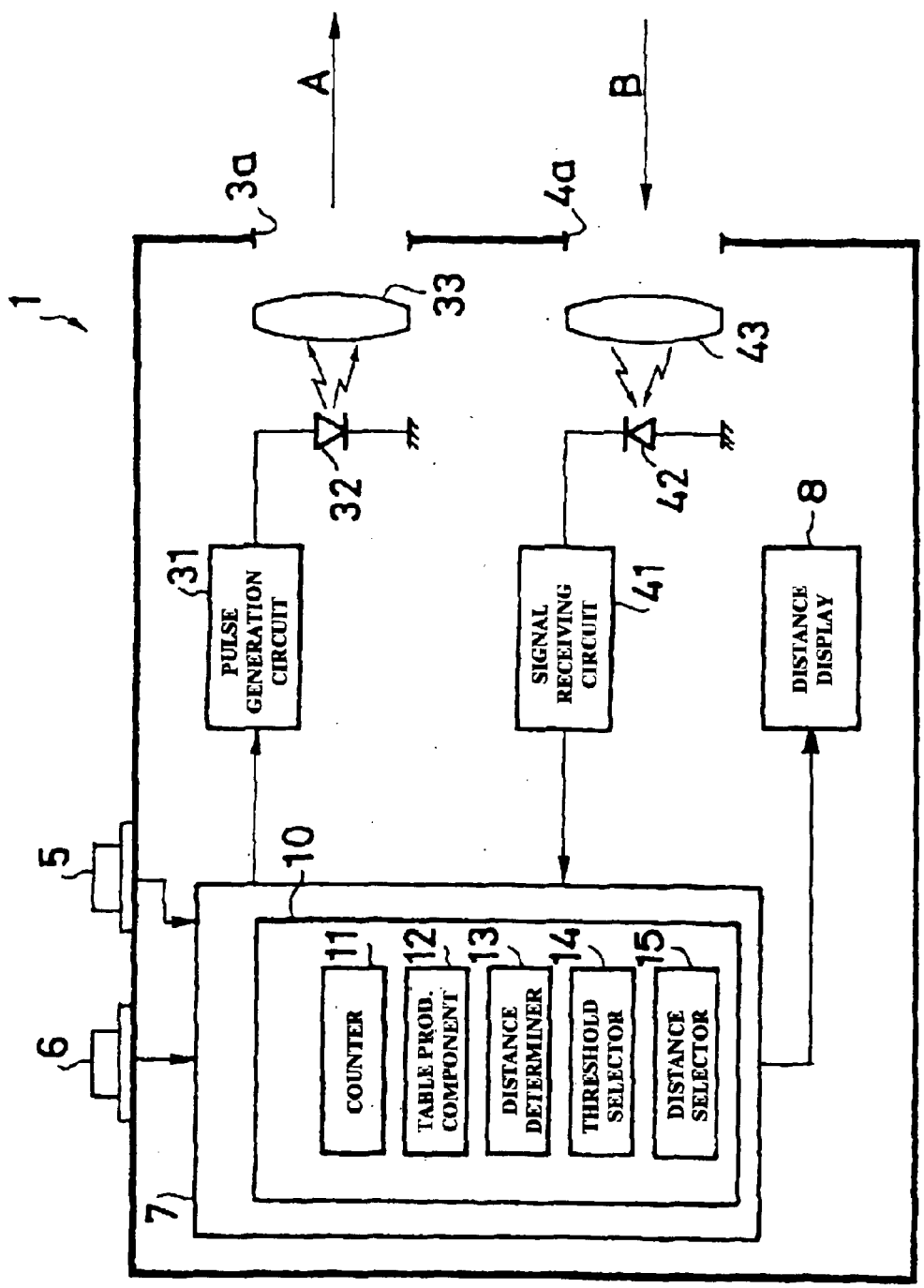
FIG. 2 is a block diagram illustrating the structure of the above-mentioned ranging apparatus.

FIG. 2 shows the simplified internal structure of this ranging apparatus 1. In addition to the structure described above, also provided are a controller 7 having a distance computer 10, and a distance display 8 that displays distances by receiving display signals from the controller 7. The distance computer 10 comprises a counter 11, a table production component 12, a distance determiner 13, a threshold selector 14, and a distance selector 15, the details of which will be described below. The distance display 8 performs distance display in the interior of the finder window 2a, and is designed so that when the user looks into the finder window 2a, the distance is displayed within the field of vision thereof. Furthermore, a distance display that performs liquid crystal display, for example, may be provided on the outside of the case 2. The controller 7 is designed to receive the input of operation signals from the first and second control buttons 5 and 6. The laser light emitter 3 comprises a pulse generation circuit 31, a light emitting element (semiconductor laser) 32, and a collimating lens 33, while the reflected light receiver 4 comprises a signal receiving circuit 41, a light receiving element (photodiode) 42, and a focusing lens 43.

Figure 4:
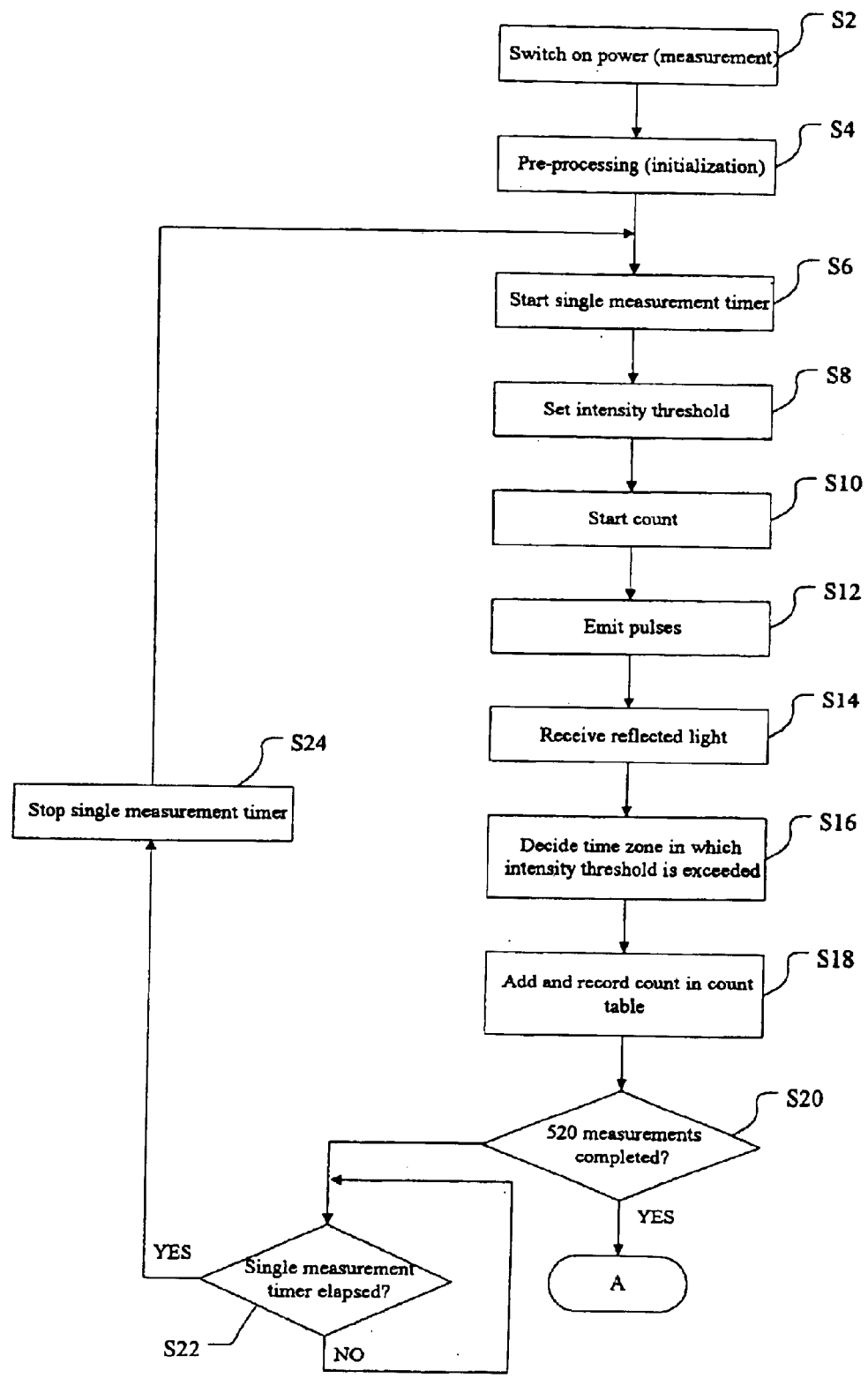
FIG. 4 is a flow chart illustrating a ranging method carried out using the above-mentioned ranging apparatus.
Figure 5:
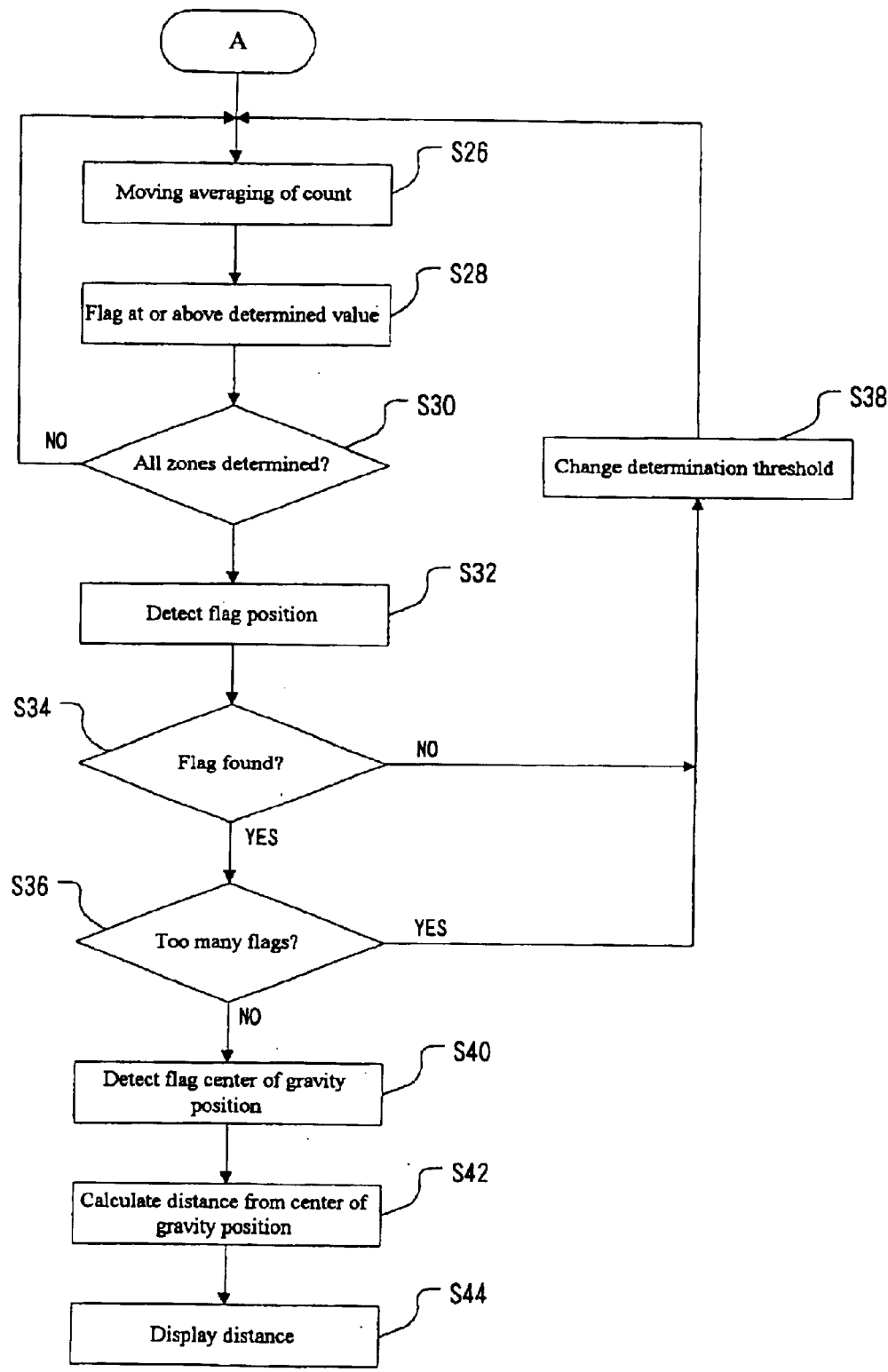
FIG. 5 is a flow chart illustrating a ranging method carried out using the above-mentioned ranging apparatus.

The operation when the distance to an object of measurement is measured using the ranging apparatus 1 structured as above will be described below through reference to the flow charts shown in FIGS. 4 and 5. The flows in FIGS. 4 and 5 are connected where indicated by the circled A, and together constitute a single flow.

Figure 3:
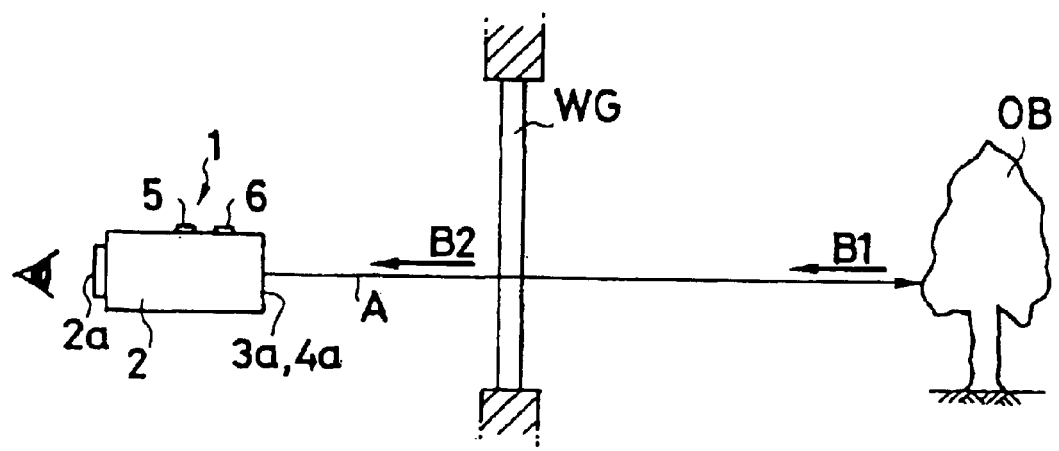
FIG. 3 is a diagram illustrating how distance measurement is performed with the above-mentioned ranging apparatus by looking at an object of measurement through window glass.

The example described here will be for a case in which, as shown in FIG. 3, the distance to a far-away object of measurement OB is measured through window glass WG using the ranging apparatus 1. When the ranging apparatus 1 is used to measure the distance to the object of measurement OB, first, as shown in FIG. 3, the user operates the first control button 5 while looking through the finder window 2a and seeing the object of measurement OB through the window glass WG. As a result, the power is switched on, an operation signal is inputted from the first control button 5 to the controller 7, and distance measurement operation commences (step S2). The corresponding pre-processing shown in step S4 is performed, and initialization processing such as clearing the various memories is carried out.

Next, a single measurement timer is started (step S6), and an intensity threshold TL is set (step S8). Then, a timer counter is started (step S10), and the pulse generation circuit 31 is actuated by the controller 7 so that pulsed laser light is emitted from the light emitting element 32 (step S12). This laser light is emitted through the collimating lens 33 and from the laser light emission window 3a toward the object of measurement (the laser light indicated by arrow A in FIGS. 2 and 3).

The laser light A emitted from the ranging apparatus 1 in this manner first hits the window glass WG located nearby, and some of the light is reflected (arrow B2). The rest of the laser light reaches the object of measurement OB. The laser light that reaches the object of measurement OB here is reflected as indicated by arrow B1. Part of the light reflected by the window glass WG (indicated by arrow B2) and the light reflected by the object of measurement OB (indicated by arrow B1) (this part is the light reflected toward the ranging apparatus 1) is then incident inside the reflected light reception window 4a (see arrow B in FIG. 2), where it is focused by the focusing lens 43 before reaching the light receiving element 42. When the light receiving element 42 is thus irradiated with the reflected light, a signal corresponding to the intensity of the reflected light is sent to the signal receiving circuit 41, and this signal receiving circuit 41 amplifies or otherwise processes this signal before sending it on to the controller 7.

Figure 6:
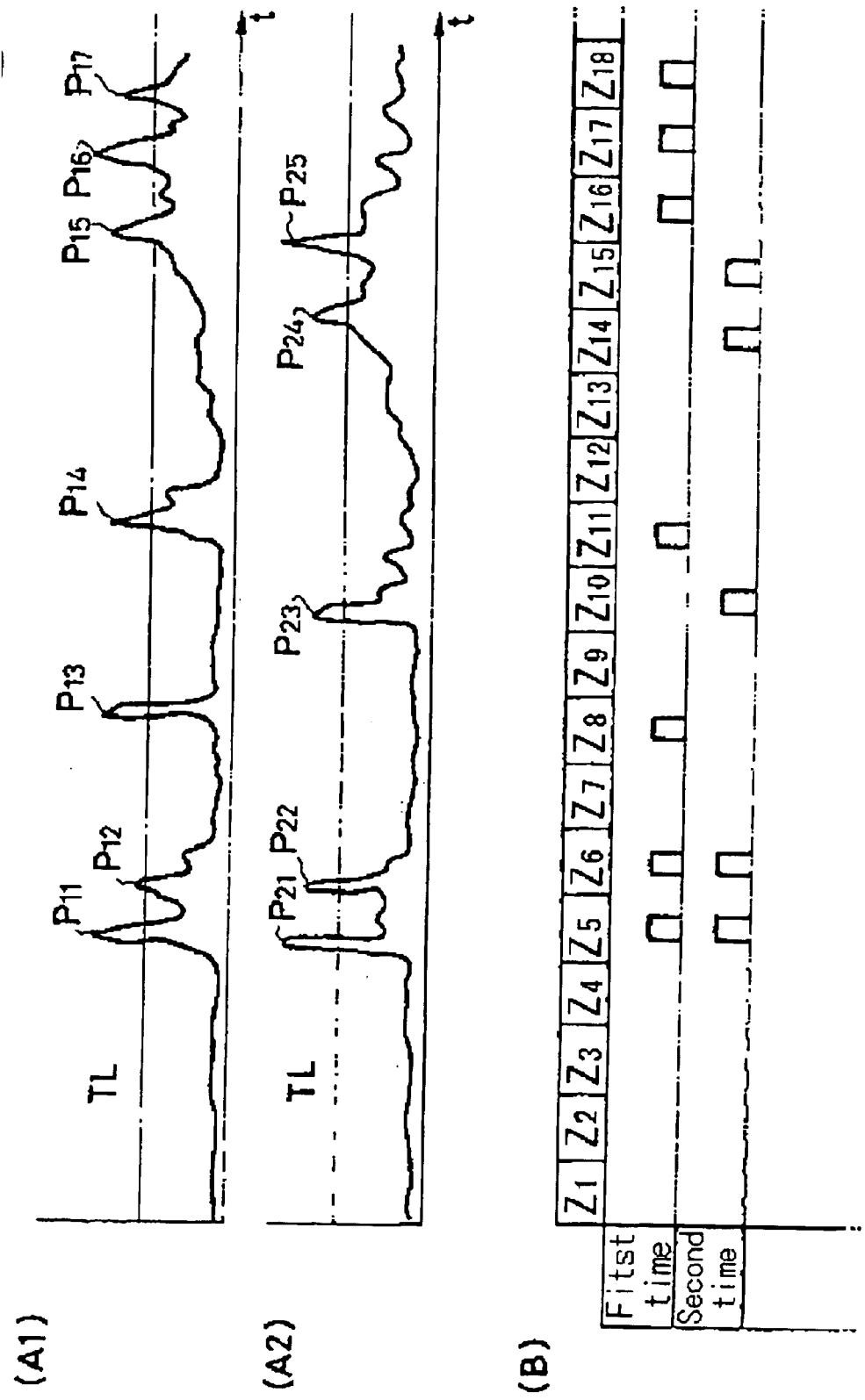
FIG. 6 consists of graphs of the reflected light intensity versus elapsed time when reflected light is received by the above-mentioned ranging apparatus, and a diagram illustrating the state when flags are set in time zones in which this reflected light intensity exceeds an intensity threshold.

Thus, in the controller 7, a reflected light signal as shown in FIG. 6 (A1) is received (step S14), and the distance to the object of measurement OB is measured from this received signal by the distance computer 10 as follows. In FIG. 6 (A1), the horizontal axis indicates the elapsed time, the origin of which is the point when pulsed laser light is emitted from the laser light emitter 3, and the vertical axis indicates the intensity of the reflected light that is received. Specifically, FIG. 6 (A1) shows the change over time in the intensity of the reflected light received by the reflected light receiver 4 from the time when the pulsed laser light is emitted from the laser light emitter 3 in step S12.

When this reflected light is detected, the system searches for a point at which the reflected light intensity is over the intensity threshold TL set in step S8, and the time zone in which this point is located is recorded (step S16). These time zones are formed by division into fixed time intervals (such as 12.5 ns), as shown in FIG. 6 (B), on the basis of the count of the timer counter started in step S10. Accordingly, when the reflected light intensity is as shown in FIG. 6 (A1), for instance, flags are set up as shown in the first row in FIG. 6(B) in the time zones including the locations of peaks $P_{11}$ to $P_{17}$ that exceed the intensity threshold TL (indicated by one-dot chain lines in the drawings), and the time zones $Z_5$, $Z_6$, $Z_8$, $Z_{11}$, $Z_{16}$, $Z_{17}$, and $Z_{18}$ in which these flags have been set up are recorded in step S16.

Figures 7, 8:
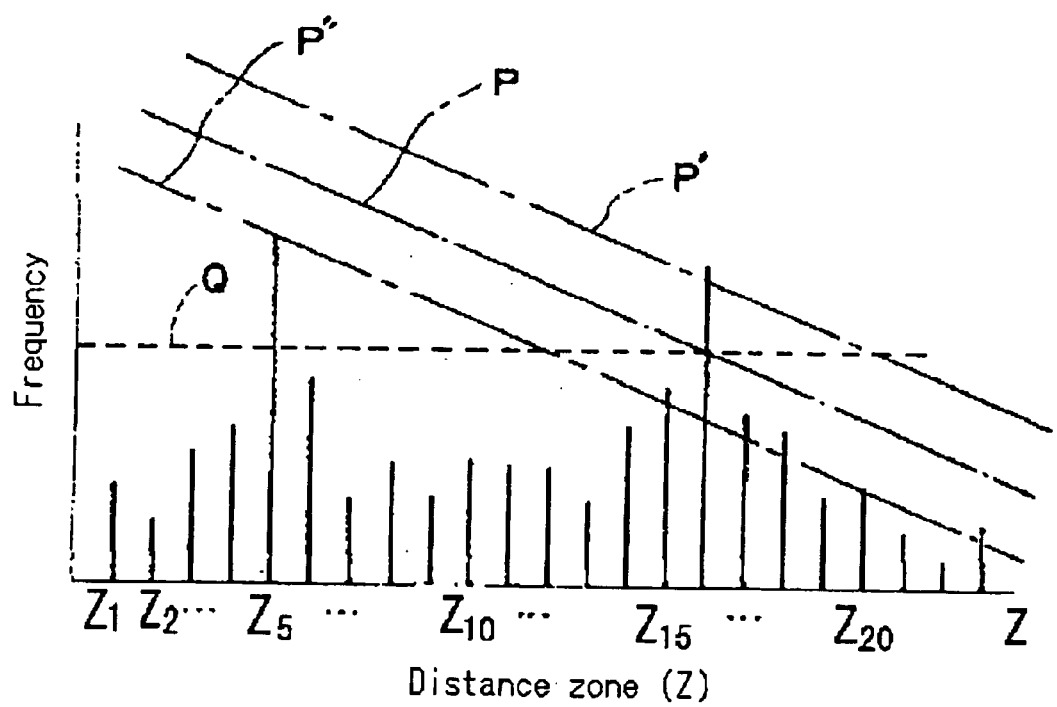
FIG. 7 is a diagram of a count table formed by the counter constituting part of the distance computer of the above-mentioned ranging apparatus.
FIG. 8 illustrates a frequency distribution table formed by the table production component constituting part of the above-mentioned distance computer.

The elapsed time from the point when the pulsed laser light is emitted from the laser light emitter 3 until the reflected light is received by the reflected light receiver 4 can be converted into distance, and the above-mentioned time zones converted into corresponding distance zones, by using the spatial propagation speed of laser light. In the description herein, the time zones and distance zones are both indicated by the same symbols as $Z_1$, $Z_2$, . . . , with corresponding zones being numbered the same. Then, as shown in FIG. 7, one count is added and recorded in each distance zone where one of the above-mentioned flags was set up in the count table formed corresponding to the various distance zones $Z_1$, $Z_2$, . . . by the counter 11 constituting part of the distance computer 10 of the controller 7. In the above case, one count is recorded in each of the distance zones $Z_5$, $Z_6$, $Z_8$, $Z_{11}$, $Z_{16}$, $Z_{17}$, and $Z_{18}$.

In this example, furthermore, the window glass WG in FIG. 3 is in distance zone $Z_5$, and the object of measurement OB is near distance zone $Z_{16}$. Accordingly, it is believed that the peaks $P_{11}$ and $P_{12}$ in FIG. 6 (A1) are reflected light from the window glass WG, and that the peaks $P_{15}$, $P_{16}$, and $P_{17}$ are reflected light from the target OB, and it is believed that the other peaks $P_{13}$ and $P_{14}$ are the result of natural light or the like being detected as noise light.

In this example, the flow from the above-mentioned step S6 to step S18 consists of a total of 520 iterations, and a judgment is made in step S20 as to whether 520 measurements have been completed. At the stage where irradiation with the first laser pulse is performed as described above, the flow moves to step S22, waits for the single measurement timer to elapse (after 1 ms, for instance), and then moves on to step S24, at which point the single measurement timer is stopped.

The flow then moves to step S6, the single measurement timer is restarted, and measurement by irradiation with the second laser pulse is commenced. Thereafter, the setting of the intensity threshold TL (step S8), the start of the timer counter (step S10), and the emission of pulsed laser light (step S12) are carried out the same as the first time, and the reflected light is received (step S14). Thus, FIG. 6 (A2) shows the change in intensity over the elapsed time of the received reflected light for the second irradiation with pulsed laser light. Here again, flags are set up as shown in the second row in FIG. 6(B) in the time zones including the locations of peaks $P_{21}$ to $P_{25}$ that exceed the intensity threshold TL set in step S8, and the time zones $Z_5$, $Z_6$, $Z_{10}$, $Z_{14}$, and $Z_{15}$ in which these flags have been set up are recorded in step S16.

Then, just as with the first irradiation with pulsed laser light, one count is added and recorded in each distance zone where one of the above-mentioned flags was set up in the count table shown in FIG. 7. In this case, one count is added and recorded in each of the distance zones $Z_5$, $Z_6$, $Z_{10}$, $Z_{14}$, and $Z_{15}$; since one count has been recorded in distance zones $Z_5$ and $Z_6$ the first time around, the recorded count in these distance zones is 2.

FIG. 7 shows the count in the count table when 520 irradiations of pulsed laser light have been performed at the set time interval (such as 1 ms) of the single measurement timer. Once 520 irradiations of pulsed laser light have been completed in this manner, the flow moves to step S26, where the count in the various distance zones is subjected to moving averaging. This moving averaging is processing in which the average count at the distance zones $Z_{n-1}$, $Z_n$, and $Z_{n+1}$ including the n-th distance zone $Z_n$ and the zones before and after this $Z_n$, for example, is reset as the count for the distance zone $Z_n$ in the count table in FIG. 7. The goal, effect, and so forth of this moving averaging will be discussed below.

The table production component 12 of the distance computer 10 produces the frequency distribution table (histogram) shown in FIG. 8 from the count table that has undergone this moving averaging. In the frequency distribution table thus produced, the count is greater in distance zone $Z_5$ corresponding to the location of the window glass WG and distance zone $Z_{16}$ corresponding to the location of the object of measurement OB, where it is highly probable that reflected light will be always generated.

The distance determiner 13 then determines whether there is a frequency that exceeds a determination threshold P that varies with distance (distance zone) in this frequency distribution table, and sets up a flag in a distance zone where the determination threshold P is exceeded (steps S28 and S30). Here, since the count in the frequency distribution table is greater in distance zone $Z_5$ corresponding to the location of the window glass WG and distance zone $Z_{16}$ corresponding to the location of the object of measurement OB, if the determination threshold Q with a constant value, indicated by the broken line in FIG. 8, is used to determine frequencies exceeding this value, flags will be set up in both distance zone $Z_5$ corresponding to the location of the window glass WG and distance zone $Z_{16}$ corresponding to the location of the object of measurement OB.

Accordingly, the determination is made using the determination threshold P set to vary with distance as shown by the one-dot chain line P in FIG. 8 (that is, set to decrease as the distance increases). As a result, no flag is set up in distance zone $Z_5$ corresponding to the location of the window glass WG, and a flag is only set up in distance zone $Z_{16}$ corresponding to the location of the object of measurement OB, thereby affording more accurate measurement of the distance to the object of measurement OB. However, either determination threshold P or Q may be used in the ranging apparatus and method of the present invention.

The flow then moves on to step S32, in which the flag position, that is, the distance zone where a flag has been set up, is detected. At this point, there may be no flags whatsoever set up if the count is low with respect to the size of the determination threshold P, and conversely, if the count is high with respect to the size of the determination threshold P, the counts in a plurality of distance zones may exceed the determination threshold P, and a plurality of flags may be set up. This is why the threshold selector 14 is provided to the distance computer 10, and a plurality of types of threshold are preset as the determination threshold P. For instance, the determination threshold P shown in FIG. 8 is set to a determination threshold (a type of determination threshold having a large value) P' that has been moved upward in parallel, and a determination threshold (a type of determination threshold having a small value) P" that has been moved downward in parallel.

Then, in the threshold selector 14, if there are no flags, the flow moves from step S34 to step S38, the determination threshold P" of the type having a small value is selected as the determination threshold P, and steps S26 to S32 are repeated. On the other hand, if there are too many flags, the flow moves from step S36 to step S38, the determination threshold P' of the type having a large value is selected, and steps S26 to S32 are repeated. This adjusts the set-up flags to a suitable number.

The above description was for a case in which a plurality of types of threshold had been preset as the determination threshold P, but another possibility is to predetermine the initial determination threshold and the incremental and decremental widths of the determination threshold, so that when there are too many flags, the determination threshold value is incremented by 1 in step S38, and when there are too few flags, the determination threshold value is decremented by 1 in step S38, with steps S26 to S32 being repeated until the desired number of flags are obtained.

Then, the center of gravity position corresponding to distance zones in which flags have been set up is found by performing weighted averaging on the basis of the counts of the distance zones before and after the distance zones at positions where flags have been set up (step S40), this center of gravity position is calculated as the distance to the object of measurement OB (step S42), and this calculated distance is displayed by the distance display 8 (step S44).

Furthermore, when a plurality of flags have been set up in the above flow, the threshold selector 14 is actuated according to operation of the second control button 6, a specific flag is selected from among the plurality of flags, and the distance at the center of gravity position of that flag is displayed by the distance display 8.

When the distance to the object of measurement OB was measured with the ranging apparatus 1 as described above, the count table shown in FIG. 7 was formed by converting time zones to distance zones. However, the count table may instead be produced by using the time zones "as is." In this case, time zones can be used for the horizontal axis in the frequency distribution table in FIG. 8 as well, and the distance to the object of measurement OB can be calculated from the elapsed time at the position where a flag is set up. Moreover, the intensity threshold TL is a constant value in FIG. 6 (A1) and (A2), but may instead be an intensity threshold that varies with elapsed time. More specifically, the intensity threshold that decreases as the elapsed time increases may also be used.

In addition, in the above-mentioned embodiment, the determination threshold was changed and selected according to the number of flags when the determination threshold P was used, but the determination threshold P may instead be changed manually. Furthermore, the determination threshold P used initially may be pre-varied according to external conditions. For example, when it is bright and there is much natural light that would become noise, such as during the day, the determination threshold P may be set high, and at night the determination threshold P may be set low.

The above description is of an example of the simple modeling of a single object of measurement OB, but when the ranging apparatus 1 is actually used to view an object of measurement through the finder 2a, there will be objects in the vicinity of the object of measurement to be measured. Accordingly, the laser light emitted from the laser light emitter 3 irradiates not only the object of measurement, but also its surrounding objects, and the reflected light receiver 4 also receives reflected light from these objects. Therefore, the count is greater in a plurality of distance zones in the frequency distribution table shown in FIG. 8, and there are a plurality of distance zone that exceed the determination threshold. Furthermore, there may be cases in which a plurality of close objects of measurement are viewed at the same time through the finder 2a and the goal is to measure the distances to the plurality of objects of measurement, and here again, there will be a plurality of distance zones that exceed the determination threshold.

In situations such as these, in this embodiment, the flow moves to step S40 while flags are still set up in a plurality of distance zones, the center of gravity position for each flag is calculated, and a plurality of distances are determined. Then, a specific distance is selected from among the above-mentioned plurality of distances by the distance selector 15, and this is displayed by the distance display 8.

Thus, the selection made by the distance selector 15 can, for instance, consist of selecting the greatest distance and displaying it on the distance display 8, selecting the least distance and displaying it on the distance display 8, or selecting the n-th greatest distance (where n is a positive integer) and displaying it on the distance display 8. Which of these selection methods is to be employed may be programmed in ahead of time, but the system can also be designed so that the method is selected and set by operating the second control button 6.

Conceivable conditions for selecting the distance as above include the type of object being ranged, the weather conditions during ranging, and other such usage conditions, and the system can also be designed to allow these to be switched and set by operation of the second control button 6. In this case, the distance selector 15 selects a specific distance on the basis of the selection conditions set by operation of the second control button 6 by the user, and this distance is displayed on the distance display 8.

When the distance selector 15 selects a distance and displays it on the distance display 8 according to a usage condition, etc., this usage condition can be, for example, the focal position (such as the position of the focal ring) of the finder 2a through which the object of measurement is viewed. In this case, the distance selector 15 will select a greater distance when the finder 2a is focused farther away, the distance selector 15 will select a shorter distance when the focus is nearer, and this distance will be displayed on the distance display 8. Furthermore, the weather during ranging can also be used as a usage condition. For example, when the distance to a target is measured in the rain or snow, reflected light from raindrops or snowflakes will be admixed, but since the reflected light from the closer raindrops or snowflakes has a greater effect, the distance selector 15 selects a greater distance. Moreover, these usage conditions, etc., can be switched and set as desired by the user by operating the second control button 6.

The system may also be designed so that when the distance determiner 13 determines a plurality of distances to an object of measurement, the distance selector 15 determines that there are a plurality of objects of measurement, and the plurality of distances are displayed on the distance display 8. In this case, all of the plurality of distances may be displayed at once on the distance display 8, or the plurality of distances may be switched in order and displayed one after the other. In this case, the switching of the display mode, and the switching of the plurality of distances in the display in order may be accomplished by operating the second control button 6.

Furthermore, as described above, in the distance measurement that makes use of the ranging apparatus 1, moving averaging is performed on the count in each distance zone in step S26 in the count table shown in FIG. 7 and formed by adding up the count values for 520 times. This will be described below.

Figure 9:
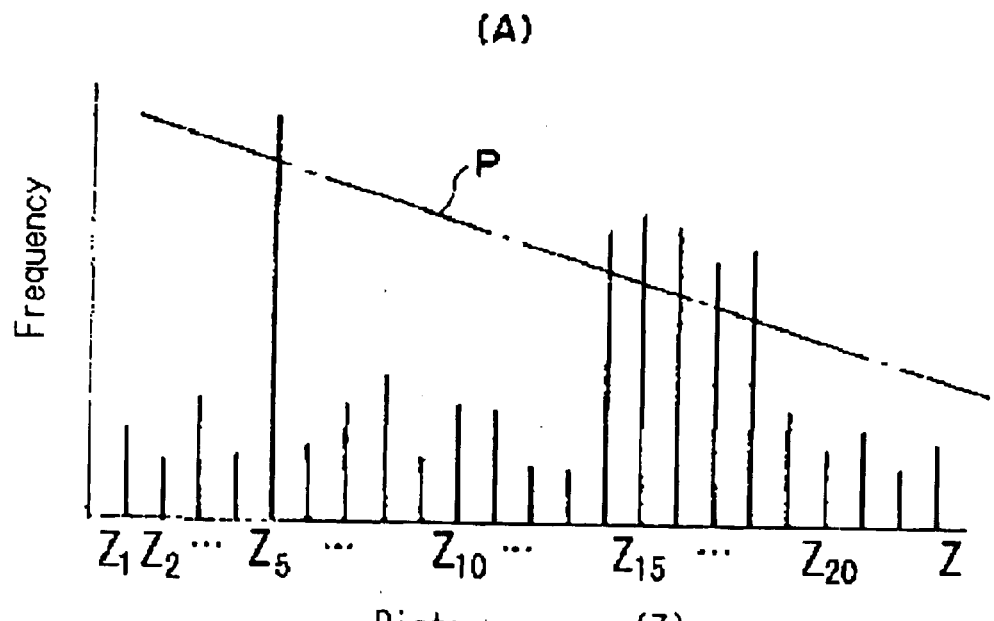
FIG. 9 illustrates a frequency distribution table before moving averaging is performed, and a frequency distribution table when moving averaging is performed.
Figure 9:
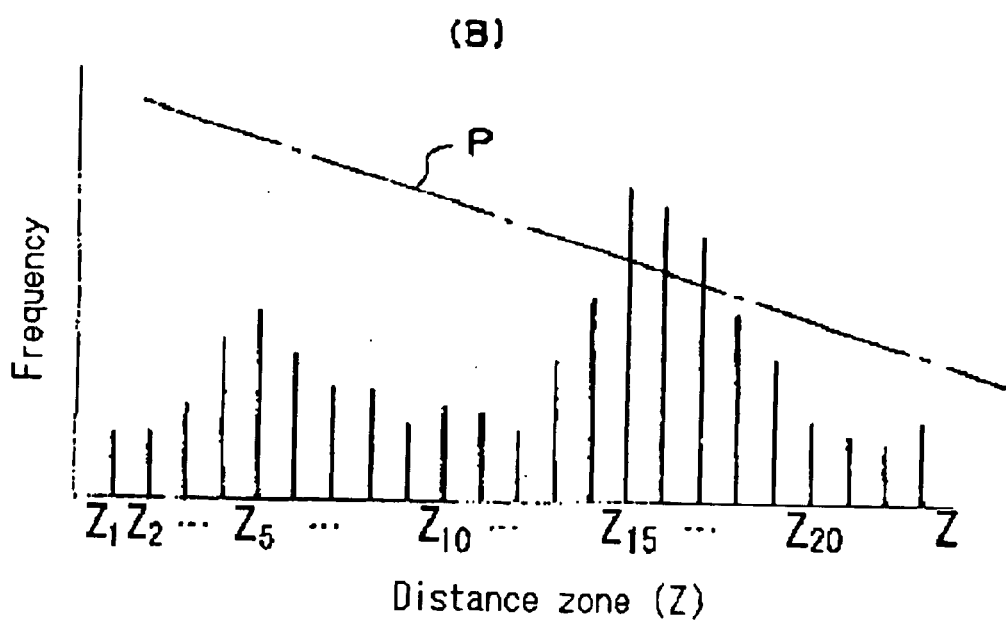

FIG. 9(A) shows an example of producing a frequency distribution table by directly using the frequencies in a count table that has not undergone moving averaging. With the frequency distribution table in this figure, the count has a large peak in distance zone $Z_5$, and the count increases over the range of distance zones $Z_{14}$ to $Z_{18}$. This is because, for example, a peak was generated in distance zone $Z_5$ by reflected light from tree branches or the like in front of the object of measurement OB. Because tree branches and so forth have no longitudinal depth, the count is high only in distance zone $Z_5$, while the count is low in the preceding and subsequent distance zones $Z_4$ and $Z_6$. The object of measurement OB here is one with some depth longitudinally, so the count is high over a wide range of distance zones $Z_{14}$ to $Z_{18}$.

If the determination threshold P is used to detect a distance zone having a frequency over this threshold in the frequency distribution table shown in FIG. 9(A), that is, a frequency distribution table that has not undergone moving averaging, then flags are set up in all of the distance zones $Z_5$ and $Z_{14}$ to $Z_{18}$, which show high frequencies as indicated in the figure, and all of these are determined to be distances to an object of measurement. The problem is therefore that the determination of distance to the object of measurement is ambiguous, resulting in inaccurate measurement.

Because of this, moving averaging is performed in step S26 in the present embodiment. This involves, for example, performing moving averaging in which an average value is found for the n-th distance zone $Z_n$ in the frequency distribution table in FIG. 9(A), including one distance zone before ($Z_{n-1}$) and one distance zone after ($Z_{n+1}$) this distance zone. For instance, if the count of the n-th distance zone $Z_n$ is $C_n$, the count of the (n−1-th distance zone $Z_{n-1}$ is $C_{n-1}$, and the count of the (n+1)-th distance zone $Z_{n+1}$ is $C_{n+1}$, then the count $C_n$ of the n-th distance zone $Z_n$ is replaced with the value $(C_{n-1}+C_n+C_{n+1})/3$.

FIG. 9(B) shows the results of this moving averaging, wherein the peak in the distance zone $Z_5$ becomes lower, and the frequencies in the distance zones $Z_{14}$ to $Z_{18}$ become lower on both sides (i.e., at the distance zones $Z_{14}$ and $Z_{18}$), which emphasizes the middle part. If a determination threshold P is used to detect a distance zone having a frequency over this threshold in the frequency distribution table in FIG. 9(B), which has thus undergone moving averaging, then flags will only be set up in the range of distance zones $Z_{15}$ to $Z_{17}$, which results in accurate measurement of the distance to the object of measurement.

Here, the moving averaging is performed by using distance zones $Z_{n-1}$ and $Z_{n+1}$, which are one behind and one ahead, respectively, of the specified distance zone $Z_n$, but moving averaging may instead be performed using two or more distance zones ahead and behind. When this is done, even if the frequency increases over a wider range of distance zones, the middle part can still be emphasized; therefore, the distance to the object of measurement can be measured accurately.

The embodiment described above combines all of the following:

(1) the function of selecting and displaying a specific distance to an object of measurement from among a plurality of distances when it is determined that such a plurality exists (distance selector), (2) the function of varying, according to distance (elapsed time), and setting the threshold used for determining as the distance to the object of measurement the point when the total count exceeds a specific threshold, (3) the function of moving averaging, in which the frequency at each distance added up is replaced with an average frequency at a plurality of distances including the distance itself and those before and after that distance, and (4) the function of changing or selecting a plurality of thresholds used for determining as the distance to the object of measurement the point when the total count exceeds a specific threshold (threshold selector).

However, it is sufficient if at least one of these functions (1) to (4) is selected as needed, and all of the functions are not necessarily required as in the above-mentioned embodiment.

The opto-electric conversion circuit in an embodiment of the present invention will be described below through reference to the drawings.

Figure 10:
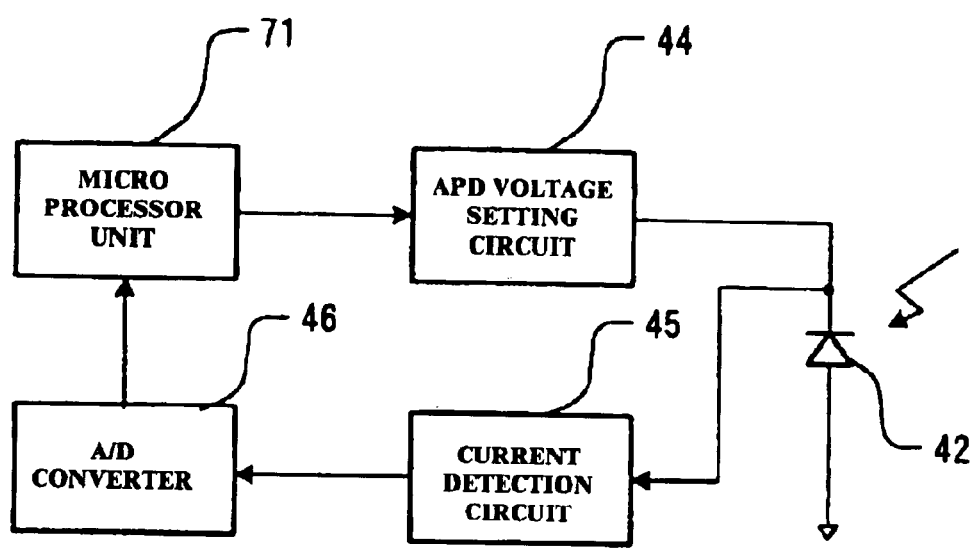
FIG. 10 is a simplified diagram illustrating the opto-electric conversion circuit in one embodiment of the present invention.

FIG. 10 is a simplified diagram illustrating the opto-electric conversion circuit constituting one embodiment of the present invention. This circuit consists mainly of an MPU (microprocessor unit) 71, and constitutes part of the laser ranging apparatus 1 in FIG. 2. The MPU 71 is part of the controller 7, and also controls distance measurement. Furthermore, an APD (avalanche photodiode) 42 corresponds to the light receiving element 42 in FIG. 2.

An APD voltage setting circuit 44 receives commands from the MPU 71, and applies reverse bias voltage of the designated value to the APD 42. This results in current corresponding to the applied reverse bias voltage flowing to the APD 42, and this current is detected by a current detection circuit 45, converted to a digital value by an A/D converter 46, and inputted to the MPU 71.

To show the relation to the claims, the APD voltage setting circuit 44 corresponds to the reverse bias voltage regulating component, the current detection circuit 45 and the A/D converter 46 correspond to the means for measuring the current flowing to the avalanche photodiode, and the program in the MPU 71 corresponds to the reference reverse bias voltage detecting component and the reverse bias voltage setting component.

Figure 11:
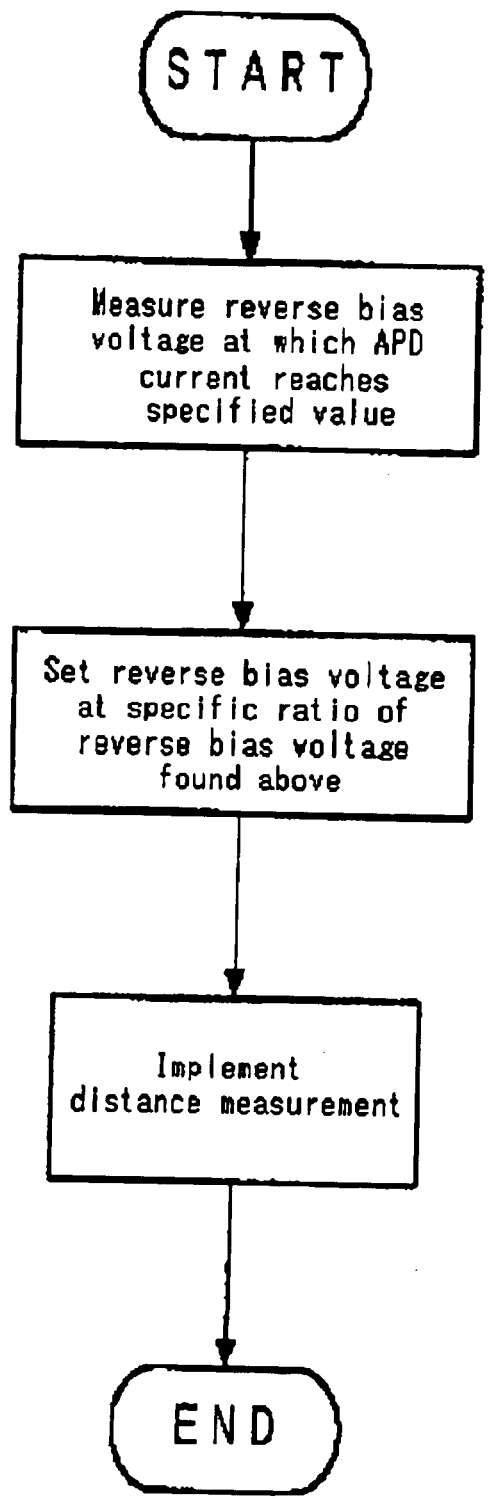
FIG. 11 is a flow chart illustrating the simplified operation of an MPU.

The operation of this circuit will be described through reference to FIGS. 11 and 12. FIG. 11 is a flow chart illustrating the simplified operation of the MPU 71, and FIG. 12 is a graph illustrating the relationship of the detected current value and the current multiplication factor to the reverse bias voltage applied to the APD 42.

The operation described in the flow chart of FIG. 11 starts up every time a distance measurement command is inputted. The MPU 71 first measures the reverse bias voltage at which the current flowing through the APD 42 will reach a specific value. In concrete terms, the command voltage value given to the APD voltage setting circuit 44 is increased in stages, which increases in stages the reverse bias voltage applied to the APD 42, and each time this happens, the current flowing through the APD 42 is measured via the current detection circuit 45. Then, the reverse bias voltage when the difference between the detected current value and the specified value is within a permissible range is termed the reference reverse bias voltage.

Figure 12:
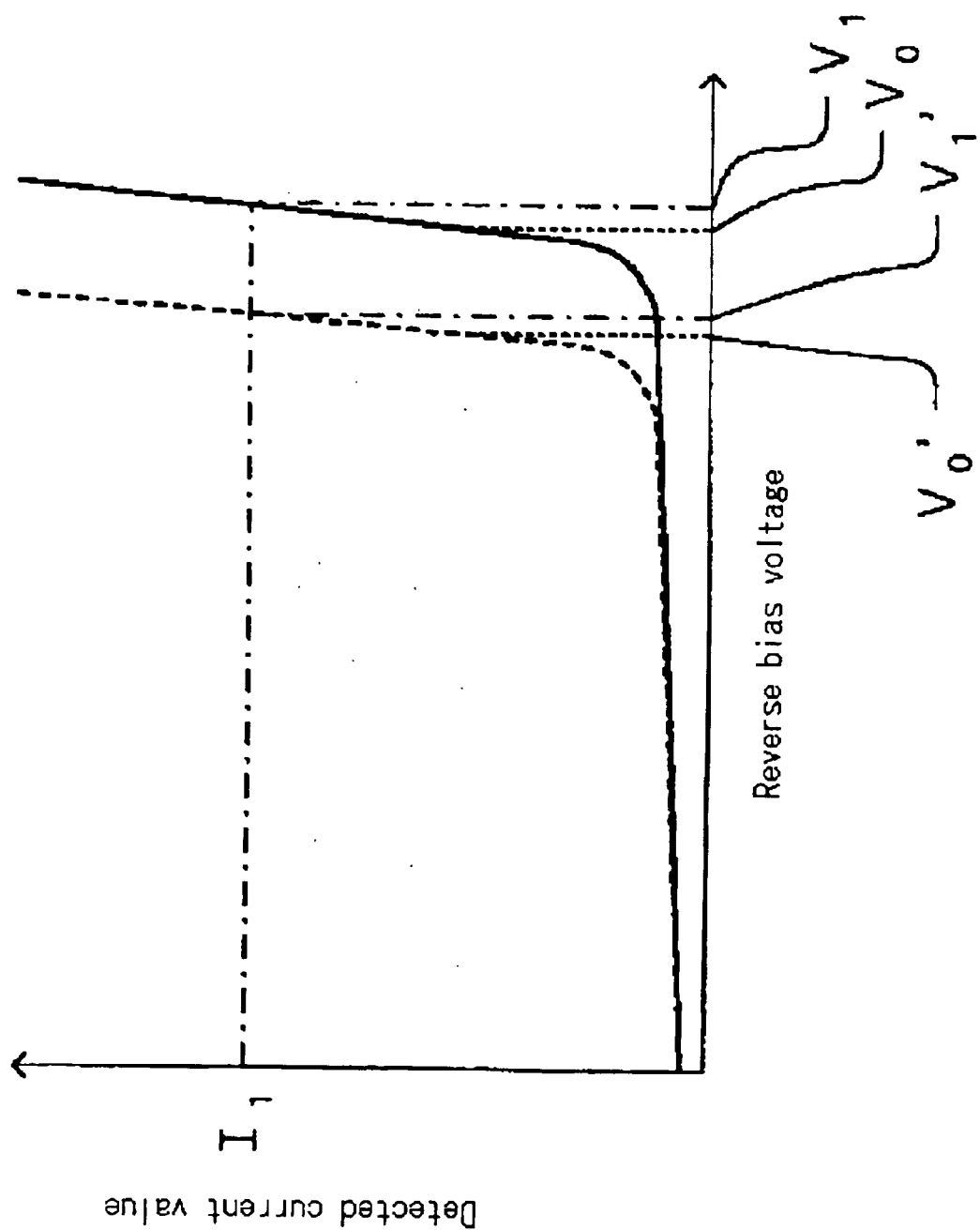
FIG. 12 is a graph of the relationship between the detected current value and the reverse bias voltage applied to an APD 3.

Referring to FIG. 12, when the above-mentioned specific current value is $I_1$ and the characteristics are as indicated by the solid line, the reference reverse bias voltage is $V_1$, but when the characteristics are as indicated by the broken line, the reference reverse bias voltage is $V_1'$.

Figure 13:
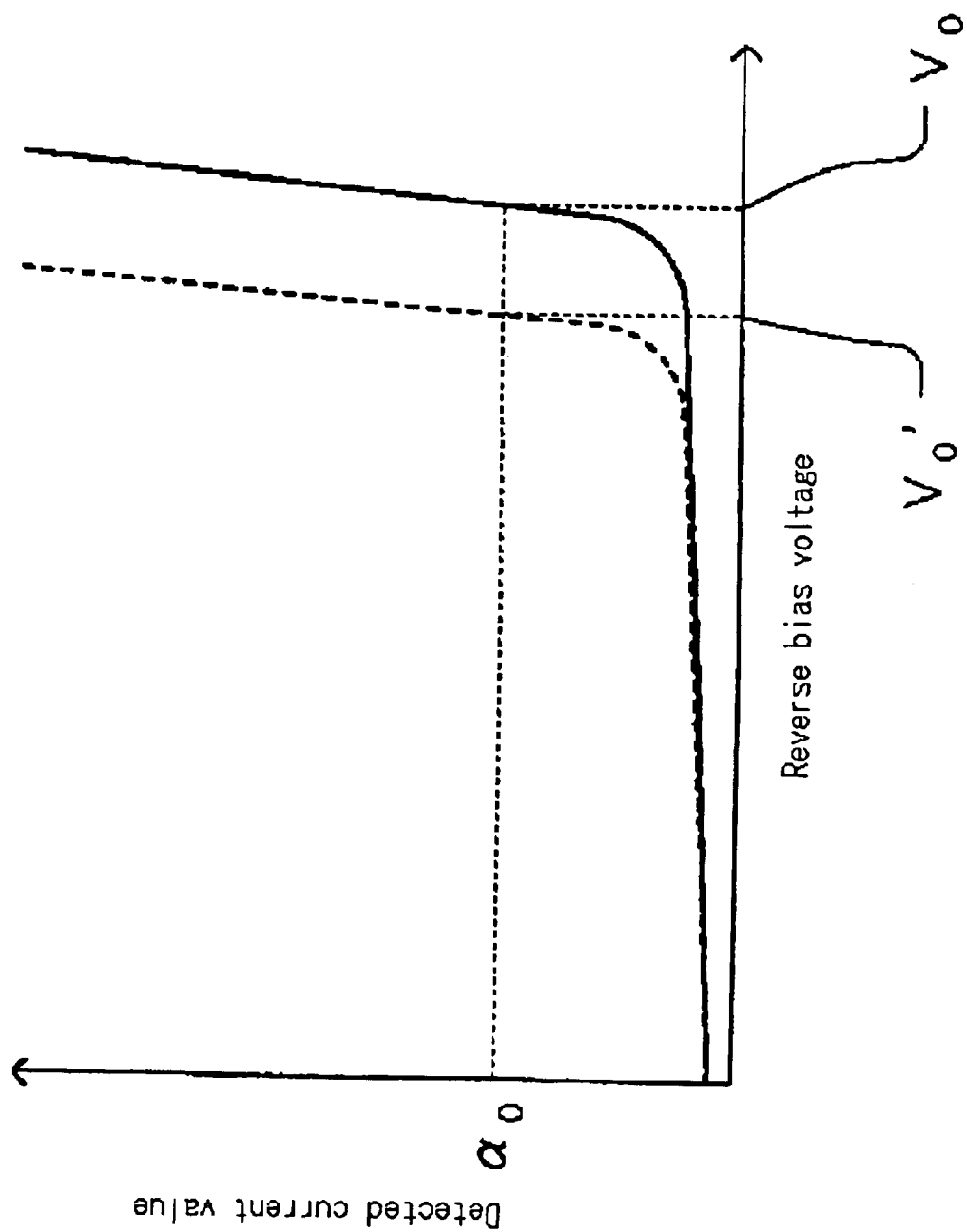
FIG. 13 is a graph of the relationship between the current multiplication factor and the reverse bias voltage applied to the APD 3.
Figure 14:
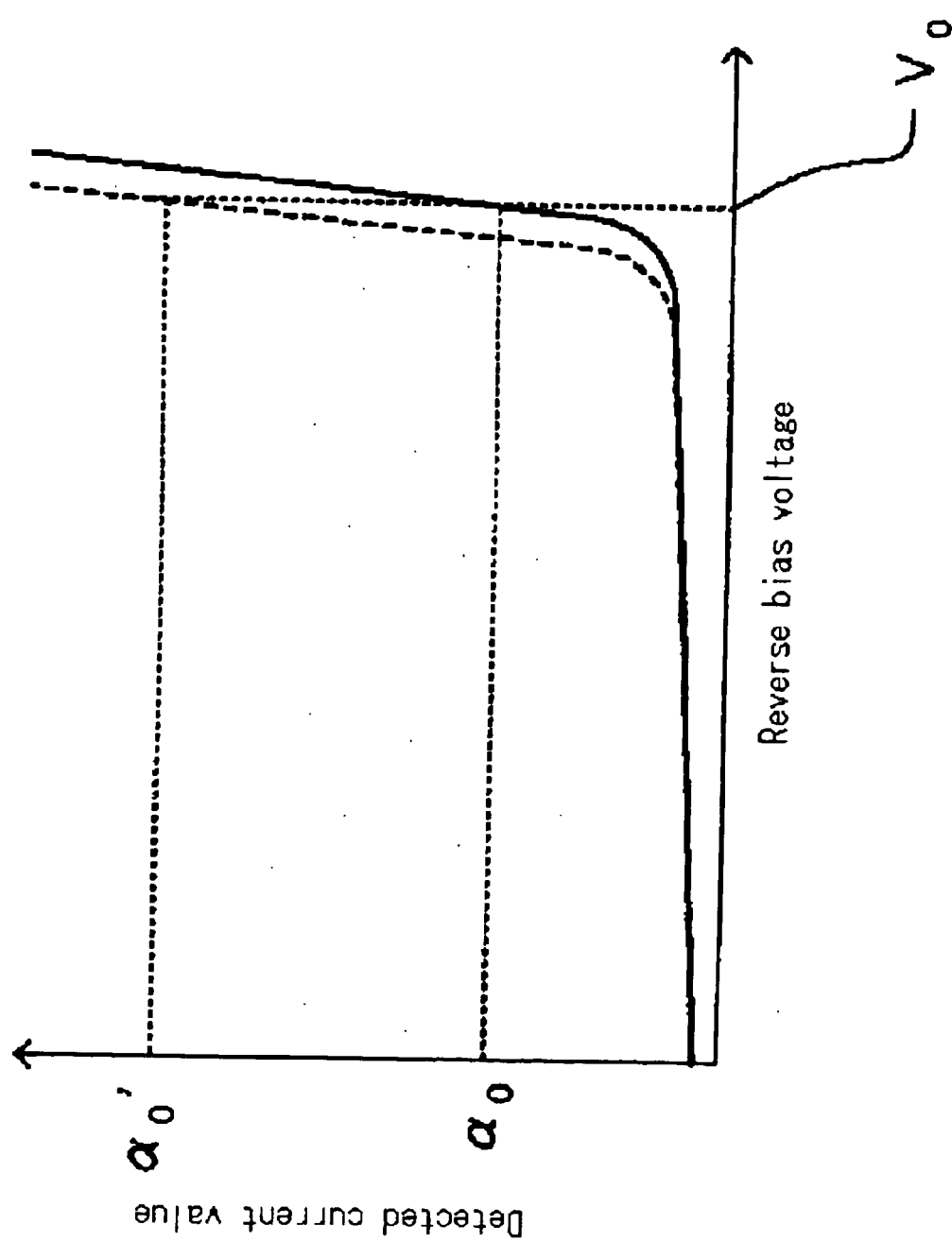
FIG. 14 is a graph of the relationship between the reverse bias voltage and the current multiplication factor.

Next, the MPU 71 decides a voltage by multiplying the reverse bias voltage thus found (the reference reverse bias voltage) by a specific ratio, and this voltage is applied to the APD 42 via the APD voltage setting circuit 44 as the reverse bias voltage to be used in measurement. As a result, as shown in FIG. 12, when the characteristics are in the state indicated by the solid line, the reverse bias voltage becomes $V_0$, whereas the reverse bias voltage becomes $V_0'$ when the characteristics are in the state indicated by the broken line. The detected current value remains constant whether the characteristics of the APD are in the state indicated by the solid line or in the state indicated by the broken line. In this case, as shown in FIG. 13, the current multiplication factor of the APD 42 is kept at a constant value of $\alpha_0$ regardless of whether the characteristics of the APD 42 are in the state indicated by the solid line or in the state indicated by the broken line.

In the above description, the operation described in the flow chart of FIG. 11 was started up every time a distance measurement command was inputted, but may instead be started up at another appropriate timing, such as every time the power is switched on to the laser ranging apparatus, at specific time intervals, or every time the temperature changes by at least a specific amount.

The MPU 71 executes distance measurement in this state. Specifically, pulsed laser light from the laser diode 32 (FIG. 2) is directed at the object of measurement, the reflected light is detected by the APD 42, and the distance to the object of measurement is found from the time lag between the point when the pulsed laser light is emitted and the point when the reflected light is detected. Stable measurement is possible here because the current multiplication factor of the APD 42 is kept at a constant value of $\alpha_0$ even if the temperature changes.

INDUSTRIAL APPLICABILITY

The ranging apparatus and ranging method pertaining to the present invention can be utilized in the fields of surveying and so forth, as well as in the measurement of distances between vehicles, the auto-focusing of cameras, and so on. Furthermore, the opto-electric conversion circuit pertaining to the present invention can be utilized in ranging apparatus and so forth.

What is claimed is:

1. A ranging apparatus comprising: a measurement light emitter for emitting pulsed measurement light toward an object of measurement; a reflected light receiver for receiving light reflected back from the above-mentioned object of measurement; a distance computer for finding the distance to the above-mentioned object of measurement on the basis of the elapsed time from when the above-mentioned measurement light is emitted until the above-mentioned reflected light is received; and a distance display for displaying the distance to the above-mentioned object of measurement, wherein the above-mentioned distance computer comprises: a counter for counting the frequency corresponding to distance when the above-mentioned reflected light satisfies a specific condition; a table production component for producing a frequency distribution table corresponding to distance by adding up the above-mentioned frequencies with respect to the above-mentioned measurement light repeatedly emitted a specific number of times; a distance determiner for determining as the distance to the above-mentioned object of measurement the point when the total count in the above-mentioned frequency distribution table exceeds a specific threshold; and a distance selector for selecting (a) specific distance(s) from among a plurality of distances when the above-mentioned distance determiner determines a plurality of distances to the above-mentioned object of measurement, and displaying the selected distance on the above-mentioned distance display.

2. A ranging apparatus comprising: a measurement light emitter for emitting pulsed measurement light toward an object of measurement; a reflected light receiver for receiving light reflected back from the above-mentioned object of measurement; a distance computer for finding the distance to the above-mentioned object of measurement on the basis of the elapsed time from when the above-mentioned measurement light is emitted until the above-mentioned reflected light is received; and a distance display for displaying the distance to the above-mentioned object of measurement, wherein the above-mentioned distance computer comprises: a counter for counting the frequency corresponding to elapsed time when the above-mentioned reflected light satisfies a specific condition; a table production component for producing a frequency distribution table corresponding to elapsed time by adding up the above-mentioned frequencies with respect to the above-mentioned measurement light repeatedly emitted a specific number of times; a distance determiner for determining as the distance to the above-mentioned object of measurement the elapsed time, converted to distance, at which the total count in the above-mentioned frequency distribution table exceeds a specific threshold; and a distance selector for selecting (a) specific distance(s) from among a plurality of distances when the above-mentioned distance determiner determines a plurality of distances to the above-mentioned object of measurement, and displaying the selected distance on the above-mentioned distance display.

3. The ranging apparatus according to claim 1 or 2, wherein when the above-mentioned distance determiner determines a plurality of distances to the above-mentioned object of measurement, the above-mentioned distance selector selects the longest distance and displays it on the above-mentioned distance display.

4. The ranging apparatus according to claim 1 or 2, wherein when the above-mentioned distance determiner determines a plurality of distances to the above-mentioned object of measurement, the above-mentioned distance selector selects the shortest distance and displays it on the above-mentioned distance display.

5. The ranging apparatus according to claim 1 or 2, wherein when the above-mentioned distance determiner determines a plurality of distances to the above-mentioned object of measurement, the above-mentioned distance selector selects the n-th (where n is a positive integer) longest distance from among the above-mentioned plurality of distances and displays it on the above-mentioned distance display.

6. The ranging apparatus according to claim 1 or 2, wherein the above-mentioned distance selector is constructed so that the selection conditions are set by external operation by the user, and when the above-mentioned distance determiner determines a plurality of distances to the above-mentioned object of measurement, a specific distance is selected on the basis of the above-mentioned selection conditions set in the above-mentioned distance selector, and displayed on the above-mentioned distance display.

7. The ranging apparatus according to claim 1 or 2, wherein when the above-mentioned distance determiner determines a plurality of distances to the above-mentioned object of measurement, the above-mentioned distance selector selects the distance according to a usage condition, etc., and displays it on the above-mentioned distance display.

8. The ranging apparatus according to claim 7, wherein the focal point of a finder for sighting the above-mentioned object of measurement is used as the above-mentioned usage condition, the above-mentioned distance selector selects a long distance when the above-mentioned focal point is far, and the above-mentioned distance selector selects a short distance when the above-mentioned focal point is near.

9. The ranging apparatus according to claim 7, wherein the weather at the time of ranging is used as the above-mentioned usage condition, and the above-mentioned distance selector selects a long distance when measuring the distance to the above-mentioned target in the rain or snow.

10. The ranging apparatus according to claim 7, wherein the above-mentioned usage conditions, etc., can be switched and set by the user.

11. The ranging apparatus according to claim 1 or 2, wherein when the above-mentioned distance determiner determines a plurality of distances to the above-mentioned object of measurement, the above-mentioned distance selector determines that there are a plurality of the above-mentioned objects of measurement, and displays a plurality of distances on the above-mentioned distance display.

12. The ranging apparatus according to claim 11, wherein all of the above-mentioned plurality of distances are displayed at once on the above-mentioned distance display.

13. The ranging apparatus according to claim 11, wherein the above-mentioned plurality of distances are displayed one after another on the above-mentioned distance display.

14. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to distance is performed when the above-mentioned reflected light for each emission satisfies a specific condition, a frequency distribution table corresponding to distance is produced by adding up the frequencies counted in all of the above-mentioned measurement light emissions carried out a specific number of times, the point when the total count in the above-mentioned frequency distribution table exceeds a specific threshold is determined as the distance to the above-mentioned object of measurement, the distance to the above-mentioned object of measurement thus determined is displayed, and when a plurality of distances to the above-mentioned object of measurement are determined, a specific distance is selected from among the above-mentioned plurality of distances and displayed.

15. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to elapsed time is performed when the above-mentioned reflected light for each emission satisfies a specific condition, a frequency distribution table corresponding to elapsed time is produced by adding up the frequencies counted in all of the above-mentioned measurement light emissions carried out a specific number of times, the distance is found from the elapsed time at which the total count in the above-mentioned frequency distribution table exceeds a specific threshold, this distance is determined as the distance to the above-mentioned object of measurement, the distance to the above-mentioned object of measurement thus determined is displayed, and when a plurality of distances to the above-mentioned object of measurement are determined, a specific distance is selected from among the above-mentioned plurality of distances and displayed.

16. A ranging apparatus comprising: a measurement light emitter for emitting pulsed measurement light toward an object of measurement; a reflected light receiver for receiving light reflected back from the above-mentioned object of measurement; and a distance computer for finding the distance to the above-mentioned object of measurement on the basis of the elapsed time from when the above-mentioned measurement light is emitted until the above-mentioned reflected light is received, wherein the above-mentioned distance computer comprises: a counter for counting the frequency corresponding to distance when the above-mentioned reflected light satisfies a specific condition; a table production component for producing a frequency distribution table corresponding to distance by adding up the frequencies with respect to the above-mentioned measurement light repeatedly emitted a specific number of times; and a distance determiner for determining as the distance to the above-mentioned object of measurement the point when the total count in the above-mentioned frequency distribution table produced by the above-mentioned table production component exceeds a specific threshold, and the above-mentioned threshold is varied and set according to distance in the above-mentioned frequency distribution table.

17. The ranging apparatus according to claim 16, wherein the above-mentioned threshold is set so as to decrease as the distance increases in the above-mentioned frequency distribution table.

18. A ranging apparatus comprising: a measurement light emitter for emitting pulsed measurement light toward an object of measurement; a reflected light receiver for receiving light reflected back from the above-mentioned object of measurement; and a distance computer for finding the distance to the above-mentioned object of measurement on the basis of the elapsed time from when the above-mentioned measurement light is emitted until the above-mentioned reflected light is received, wherein the above-mentioned distance computer comprises: a counter for counting the frequency corresponding to elapsed time when the above-mentioned reflected light satisfies a specific condition; a table production component for producing a frequency distribution table corresponding to elapsed time by adding up the frequencies with respect to the above-mentioned measurement light repeatedly emitted a specific number of times; and a distance determiner for determining as the distance to the above-mentioned object of measurement the elapsed time, converted to distance, at which the total count in the above-mentioned frequency distribution table produced by the above-mentioned table production component exceeds a specific threshold, and the above-mentioned threshold is varied and set according to elapsed time in the above-mentioned frequency distribution table.

19. The ranging apparatus according to claim 18, wherein the above-mentioned threshold is set so as to decrease as the elapsed time increases in the above-mentioned frequency distribution table.

20. The ranging apparatus according to any of claims 16 to 19, wherein the intensity of the above-mentioned reflected light is used as the above-mentioned specific condition, and the above-mentioned counter performs a frequency count when the intensity of the above-mentioned reflected light exceeds a specific intensity threshold.

21. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to distance is performed when the above-mentioned reflected light for each emission satisfies a specific condition, a frequency distribution table corresponding to distance is produced by adding up the frequencies counted in all of the above-mentioned measurement light emissions carried out a specific number of times, and the point when the total count in the above-mentioned frequency distribution table exceeds a threshold set so as to vary according to distance is determined as the distance to the above-mentioned object of measurement.

22. The ranging method according to claim 21, wherein the above-mentioned threshold is set so as to decrease as the distance increases in the above-mentioned frequency distribution table.

23. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to elapsed time is performed when the above-mentioned reflected light for each emission satisfies a specific condition, a frequency distribution table corresponding to elapsed time is produced by adding up the frequencies counted in all of the above-mentioned measurement light emissions carried out a specific number of times, the distance is found from the elapsed time at which the total count in the above-mentioned frequency distribution table exceeds a threshold set so as to vary according to elapsed time, and this distance is determined as the distance to the above-mentioned object of measurement.

24. The ranging method according to claim 23, wherein the above-mentioned threshold is set so as to decrease as the elapsed time increases in the above-mentioned frequency distribution table.

25. The ranging method according to any of claims 21 to 24, wherein the above-mentioned specific condition is that a frequency count is performed when the intensity of the above-mentioned reflected light exceeds a specific intensity threshold.

26. A ranging apparatus comprising: a measurement light emitter for emitting pulsed measurement light toward an object of measurement; a reflected light receiver for receiving light reflected back from the above-mentioned object of measurement; and a distance computer for finding the distance to the above-mentioned object of measurement on the basis of the elapsed time from when the above-mentioned measurement light is emitted until the above-mentioned reflected light is received, wherein the above-mentioned distance computer comprises: a counter for counting the frequency corresponding to distance when the above-mentioned reflected light satisfies a specific condition; a table production component for producing a frequency distribution table corresponding to distance by adding up the frequencies with respect to the above-mentioned measurement light repeatedly emitted a specific number of times, and by performing moving averaging in which the frequency at each distance added up in this manner is replaced with an average frequency at a plurality of distances including the distance itself and those before and after that distance; and a distance determiner for determining as the distance to the above-mentioned object of measurement the point when the total count in the above-mentioned frequency distribution table exceeds a specific threshold.

27. The ranging apparatus according to claim 26, wherein the above-mentioned number of distances for which an average is calculated in the above-mentioned moving averaging can be variably set.

28. A ranging apparatus comprising: a measurement light emitter for emitting pulsed measurement light toward an object of measurement; a reflected light receiver for receiving light reflected back from the above-mentioned object of measurement; and a distance computer for finding the distance to the above-mentioned object of measurement on the basis of the elapsed time from when the above-mentioned measurement light is emitted until the above-mentioned reflected light is received, wherein the above-mentioned distance computer comprises: a counter for counting the frequency corresponding to elapsed time when the above-mentioned reflected light satisfies a specific condition; a table production component for producing a frequency distribution table corresponding to elapsed time by adding up the frequencies with respect to the above-mentioned measurement light repeatedly emitted a specific number of times, and by performing moving averaging in which the frequency at each elapsed time added up in this manner is replaced with an average frequency at a plurality of elapsed times including the elapsed time itself and those before and after that elapsed time; and a distance determiner for determining as the distance to the above-mentioned object of measurement the elapsed time, converted as distance, at which the total count in the above-mentioned frequency distribution table exceeds a specific threshold.

29. The ranging apparatus according to claim 28, wherein the above-mentioned number of elapsed times for which an average frequency is calculated in the above-mentioned moving averaging can be variably set.

30. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to distance is performed when the above-mentioned reflected light for each emission satisfies a specific condition, a frequency distribution table corresponding to distance is produced by adding up the frequencies counted in all of the above-mentioned measurement light emissions carried out a specific number of times, and by performing moving averaging in which the frequency at each distance added up in this manner is replaced with an average frequency at a plurality of distances including the distance itself and those before and after that distance, and the point when the total count in the above-mentioned frequency distribution table exceeds a specific threshold is determined as the distance to the above-mentioned object of measurement.

31. The ranging method according to claim 30, wherein the above-mentioned number of distances for which an average is calculated in the above-mentioned moving averaging is varied.

32. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to elapsed time is performed when the above-mentioned reflected light for each emission satisfies a specific condition, a frequency distribution table corresponding to elapsed time is produced by adding up the frequencies counted in all of the above-mentioned measurement light emissions carried out a specific number of times, and by performing moving averaging in which the frequency at each elapsed time added up in this manner is replaced with an average frequency at a plurality of elapsed times including the elapsed time itself and those before and after that elapsed time, the distance is found from the elapsed time at which the total count in the above-mentioned frequency distribution table exceeds a specific threshold, and this distance is determined as the distance to the above-mentioned object of measurement.

33. The ranging method according to claim 32, wherein the above-mentioned number of elapsed times for which an average is calculated in the above-mentioned moving averaging is varied.

34. A ranging apparatus comprising: a measurement light emitter for emitting pulsed measurement light toward an object of measurement; a reflected light receiver for receiving light reflected back from the above-mentioned object of measurement; and a distance computer for finding the distance to the above-mentioned object of measurement on the basis of the elapsed time from when the above-mentioned measurement light is emitted until the above-mentioned reflected light is received, wherein the above-mentioned distance computer comprises: a counter for counting the frequency corresponding to distance when the above-mentioned reflected light satisfies a specific condition; a table production component for producing a frequency distribution table corresponding to distance by adding up the frequencies with respect to the above-mentioned measurement light repeatedly emitted a specific number of times; and a distance determiner for determining as the distance to the above-mentioned object of measurement the point when the total count in the above-mentioned frequency distribution table produced by the above-mentioned table production component exceeds a specific threshold, and a plurality of types of the above-mentioned threshold are set.

35. A ranging apparatus comprising: a measurement light emitter for emitting pulsed measurement light toward an object of measurement; a reflected light receiver for receiving light reflected back from the above-mentioned object of measurement; and a distance computer for finding the distance to the above-mentioned object of measurement on the basis of the elapsed time from when the above-mentioned measurement light is emitted until the above-mentioned reflected light is received, wherein the above-mentioned distance computer comprises: a counter for counting the frequency corresponding to elapsed time when the above-mentioned reflected light satisfies a specific condition; a table production component for producing a frequency distribution table corresponding to elapsed time by adding up the frequencies with respect to the above-mentioned measurement light repeatedly emitted a specific number of times; and a distance determiner for determining as the distance to the above-mentioned object of measurement the elapsed time, converted to distance, at which the total count in the above-mentioned frequency distribution table produced by the above-mentioned table production component exceeds a specific threshold, and a plurality of types of the above-mentioned threshold are set.

36. The ranging apparatus according to claim 34 or 35, wherein the above-mentioned distance computer has a threshold selector for selecting and using the plurality of types of threshold according to the determination of the above-mentioned distance determiner.

37. The ranging apparatus according to claim 36, wherein when none of the total counts in the frequency distribution table exceed a threshold selected by the above-mentioned threshold selector, the above-mentioned threshold selector switches to a threshold with a lower value than the above-mentioned selected threshold.

38. The ranging apparatus according to claim 36, wherein when there are a plurality of total counts in the above-mentioned frequency distribution table that exceed a threshold selected by the above-mentioned threshold selector, the above-mentioned threshold selector switches to a threshold with a higher value than the above-mentioned selected threshold.

39. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to distance is performed when the above-mentioned reflected light for each emission satisfies a specific condition, a frequency distribution table corresponding to distance is produced by adding up the frequencies counted in all of the above-mentioned measurement light emissions carried out a specific number of times, the point when the total count in the above-mentioned frequency distribution table exceeds a specific threshold is determined as the distance to the above-mentioned object of measurement, a plurality of types of the above-mentioned threshold are set, and the above-mentioned plurality of types of threshold are selected and used.

40. A ranging method in which pulsed measurement light is emitted toward an object of measurement, and the distance to the above-mentioned object of measurement is determined on the basis of the elapsed time until the light reflected back from the above-mentioned object of measurement is received, wherein the above-mentioned pulsed measurement light is repeatedly emitted toward the object of measurement, a frequency count corresponding to elapsed time is performed when the above-mentioned reflected light for each emission satisfies a specific condition, a frequency distribution table corresponding to elapsed time is produced by adding up the frequencies counted in all of the above-mentioned measurement light emissions carried out a specific number of times, the distance is found from the elapsed time at which the total count in the above-mentioned frequency distribution table exceeds a specific threshold, this distance is determined as the distance to the above-mentioned object of measurement, a plurality of types of the above-mentioned threshold are set, and the above-mentioned plurality of types of threshold are selected and used.

41. The ranging method according to claim 39 or 40, wherein a specific threshold is selected from among the above-mentioned plurality of types of threshold, and when none of the total counts in the above-mentioned frequency distribution table exceed the above-mentioned specific threshold, the above-mentioned threshold is switched to a threshold with a lower value.

42. The ranging method according to claim 39 or 40, wherein a specific threshold is selected from among the above-mentioned plurality of types of threshold, and when there are a plurality total counts in the above-mentioned frequency distribution table that exceed the above-mentioned specific threshold, the above-mentioned threshold is switched to a threshold with a higher value.

43. A ranging apparatus comprising:

a measurement light emitter for emitting pulsed measurement light toward an object of measurment;

a reflected light receiver for receiving light reflected back from the object of measurement;

a distance computer for finding the distance to the object of measurement on the basis of the elapsed time from when the measurement light is emitted until the reflected light is received;

a distance display for displaying the distance to the object of measurement; and a control means that controls the selector to select one of the greatest distance or the least distance for displaying on the distance display when plurality distances are found by the distance computer.

44. A ranging apparatus according to claim 43, wherein the distance computer comprises:

a counter for counting the frequency corresponding to distance when the reflected light satisfies a specific condition;

a table production component for producing a frequency distribution table corresponding to distance by adding up the frequencies with respect to the measurement light repeatedly emitted a specific number of times; and a distance determiner for determining as the distance to the object of measurement the point when the total count in the frequency distribution table exceeds a specific threshold.

45. The ranging apparatus according to claim 43, wherein the measurement light emitter comprises a pulse generator that generates plural pulses, and the distance computer comprises a threshold setter setting the threshold that is compared with the level of the reflected light when the reflected light receiver receives the reflected light, and the threshold is set every time before the each pulsed measurement light is emitted towards the object of measurement.

46. A ranging apparatus comprising:

a measurement light emitter for emitting pulsed measurement light toward an object of measurement;

a reflected light receiver for receiving light reflected back from the object of measurement;

a distance computer for finding the distance to the object of measurement on the basis of the elapsed time from when the measurement light is emitted unitl the reflected light is received;

a distance display for displaying the distance to the object of measurement; and wherein the distance computer determines a plurality of distances to the object of measurement and selects a distance according to a usage condition and displays it on the distance display.

47. The ranging apparatus according to claim 46, wherein the focal point of a finder for sighting the object of measurement is used as the usage condition, and the distance computer selects a long distance when the focal point is far, and the distance computer selects a short distance when the focal point is near.

* * * * *